United States Patent [19]

Pierson et al.

[11] 4,057,408
[45] Nov. 8, 1977

[54] METHOD FOR MAKING PHOTOSENSITIVE COLORED GLASSES

[75] Inventors: Joseph E. Pierson; Stanley D. Stookey, both of Painted Post, N.Y.

[73] Assignee: Corning Glass Works, Corning, N.Y.

[21] Appl. No.: 736,517

[22] Filed: Oct. 28, 1976

Related U.S. Application Data

[62] Division of Ser. No. 646,259, Jan. 2, 1976, Pat. No. 4,017,318.

[51] Int. Cl.² ............ C03B 23/20; C03C 15/00; C03B 32/00; C03C 17/00
[52] U.S. Cl. ........................... 65/18; 65/30 E; 65/30 R; 65/33; 65/60 D; 65/DIG. 2; 106/39.7
[58] Field of Search ............ 65/DIG. 2, 33, 30 E, 65/30 R, 60 D, 18; 106/39.7

[56] References Cited

U.S. PATENT DOCUMENTS

| 2,515,936 | 7/1950 | Armistead, Jr. et al. ....... 65/DIG. 2 |
| 2,515,937 | 7/1950 | Stookey ............... 65/DIG. 2 |
| 2,515,943 | 7/1950 | Stookey ............... 65/DIG. 2 |
| 2,569,793 | 10/1951 | Anderson, Jr. ............. 65/DIG. 2 |
| 2,599,349 | 6/1952 | Ricker ................. 65/DIG. 2 |
| 2,658,311 | 11/1953 | Goddard ............... 65/DIG. 2 |
| 2,684,911 | 7/1954 | Stookey ............... 65/DIG. 2 |
| 2,746,193 | 5/1956 | Billian ................. 65/DIG. 2 |
| 2,752,506 | 6/1956 | Fitzgerald et al. ......... 65/DIG. 2 |
| 2,770,922 | 6/1956 | Fitzgerald et al. ......... 65/DIG. 2 |
| 3,208,860 | 9/1965 | Armistead et al. ........... 65/33 X |
| 3,788,865 | 1/1974 | Babcock et al. ............. 65/33 X |
| 3,888,689 | 12/1974 | Koizumi et al. ............. 65/60 D X |
| 3,905,791 | 9/1975 | Plumat et al. .............. 65/30 E |
| 3,920,463 | 11/1975 | Simms ................ 65/DIG. 2 |
| 3,944,697 | 3/1976 | Ichimura et al. ............ 65/30 E |
| 3,967,040 | 6/1976 | Plumat et al. .............. 65/30 E |

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

The instant invention relates to photosensitive glasses, i.e., glasses which, after an exposure to high energy or actinic radiations, can be heat treated in a certain manner to develop a colored transparent article, or which can be thermally opacified to produce a colored opal glass. More particularly, the instant invention is directed to alkali halide silver halide-containing photosensitive glasses which, through a unique sequence of shortwave radiation exposures and heat treatments, exhibit the total range of colors seen in the visible spectrum either in the transparent or in the opacified state and in three dimensions. The base glass composition can be varied widely, but the presence of silver, alkali oxide, fluorine, at least one of the group consisting of chlorine, bromine, and iodine, and, where ultra-violet radiations comprise the actinic radiations, cerium oxide is required. Multi-colored photographs and other unique decorative effects can be imparted into such glasses. Where desired, polarization effects can be secured in the glasses.

24 Claims, 7 Drawing Figures

METHOD FOR MAKING PHOTOSENSITIVE COLORED GLASSES

This is a division, of application Ser. No. 646,259, filed Jan. 2, 1976 now Pat. No. 4,017,318, issued Apr. 12, 1977.

BACKGROUND OF THE INVENTION

This disclosure of producing transparent and thermallyopacifiable photosensitive glasses is founded in such patents as U.S. Pat. Nos. 2,515,936, 2,515,943, and 2,651,145.

Thus, U.S. Pat. No. 2,515,936 refers to a "silicate glass containing, on the oxide basis by weight, 0.05% to 0.3% of silver computed as AgCl, and $CeO_2$ in an amount up to 0.05%." The specification refers specifically to glass batches equivalent to about 75% $SiO_2$, 15% $R_2O$, and 10% RO. $CeO_2$ is stated to act as a sensitizing agent. The method contemplates exposing the glass to such shortwave radiations as ultra-violet radiations, X-radiations, and radioactive radiations and then heating the exposed glass to temperatures between about 470°–500° C. The coloring is due to the development of colloidal metal particles, e.g., silver, in the glass as a result of the radiation step followed by heat treatment.

U.S. Pat. No. 2,515,943 describes thermally-opacifiable, photosensitive glasses wherein NaF crystals constitute the opacifying phase. The base glasses consisted essentially of 55–75% $SiO_2$, 12–18% $R_2O$, 2–12% $Al_2O_3$, 1.8–2.4% F, 0.005–0.05% $CeO_2$, and 0.001–0.01% Au. The glass is exposed to shortwave radiations and heated to a temperature within the range of about 100° C. below the softening point of the glass to about 50° C. above the softening point. Submicroscopic nuclei of colloidal gold are formed thereby. The nucleated glass is cooled below 520° C. to cause the formation of alkali metal fluoride nuclei on the colloidal gold particles., and thereafter the glass is reheated to 520°–570° C. to cause the fluoride nuclei to grow into opacifying crystallites. The image resulting was normally of an opaque white although the occurrence of a pink tint was noted.

U.S. Pat. No. 2,651,145 discloses thermally-opacifiable, photosensitive glasses wherein an alkali metal fluoride comprises the opacifying phase. The base glasses consisted essentially of 55–75% $SiO_2$, 5–18% $Na_2O$, 0–2% $Li_2O$, 0–13% $K_2O$, 2–12% $Al_2O_3$, 1.8–3% F, 0.005–0.05% $CeO_2$, and 0.0001–0.3% Ag, computed as AgCl. The glass was subjected to shortwave radiations and heated to a temperature within the range of about 150° C. below the softening point of the glass to about 50° C. above the softening point. Those steps resulted in the development of submicroscopic nuclei of colloidal silver. The nucleated glass was cooled below 500° C. to form alkali metal fluoride nuclei on the particles of colloidal silver. The glass was subsequently reheated to a temperature not lower than about 100° C. below the softening point of the glass to cause the fluoride nuclei to grow and form opacifying crystallites. By varying the shortwave radiation exposure time and the time and/or temperature of the first heating step, the coloration of the opacified article can be varied widely.

Although, as can be seen from the above, various colors could be produced in transparent and thermally-opacifiable (opal) glasses, control of the colors produced was so extremely difficult that little practical use could be made of the described practice. Therefore, the primary objective of the instant invention is to provide a method for producing colors in transparent and opal photosensitive glasses which permits the ready control of the colors produced.

SUMMARY OF THE INVENTION

The instant invention is founded upon a sequence of irradiation and heat treating steps applied to glasses of a wide range of base compositions but which must contain silver, alkali oxide, fluoride, at least one halide selected from the group of chloride, bromide, and iodide. Where ultra-violet radiations constitute the actinic radiation, defined below, cerium oxide is required in the glass composition.

Where glass articles potentially capable of exhibiting various colors within the visible spectrum are desired, such are first exposed to high energy or actinic radiations selected from the group consisting of ultra-violet radiations in the range of about 2800A to 3500A, X-radiations, and high velocity electrons, the time and intensity of the exposure determining the depth and ultimate hue of the colored region to be produced. This exposure develops a latent image in the glass and the final color produced is a function of the total high energy or actinic radiation flux, i.e., the product of the intensity and time of exposure to high velocity electrons, X-radiations, and/or ultraviolet radiations. Differences in shades of a particular color can be achieved by varying the flux within the limits for that color. Where high velocity electrons or X-radiations are used to promote development of color in the glass, the presents of $CeO_2$ in the composition is not required.

The glass articles are thereafter subjected to a heat treatment ranging in temperature from about the transformation range up to approximately the softening point of the glass. Colloidal silver particles are precipitated in situ to serve as nuclei. Where a transparent final product is desired, the heat treatment is continued for only so long as to cause the precipitation of the colloidal silver nuclei and to cause the growth thereon of extremely small alkali-silver halide crystallites, i.e., NaF + (AgCl and/or AgBr and/or AgI), on the nuclei. The transparent glass will appear colorless or exhibit a pale yellowish hue. Where an opal glass is desired, the heat treatment is conducted for a period of time sufficient to not only cause the precipitation of colloidal silver nuclei, but also to promote the growth of said crystallites on the nuclei to a size large enough to scatter light. The resulting opal glass will display a white or pale yellowish appearance.

In some instances, an interrupted heat treatment may be required to achieve the nucleation with or without subsequent crystallite growth. In such cases, the glass may be cooled to at least 25° C. below the strain point after the first heat treatment and thereafter again heated to a temperature between the transformation range and the softening point of the glass.

The nucleated glass is then again subjected to high energy or actinic radiations, the intensity and time of the exposure being dependent upon the intensity or saturation of the color desired in the final product. Hence, the greater the intensity of the impinging radiation, the more intense will be the colors produced. As a matter of convenience in handling, the nucleated glass is cooled to room temperature prior to this second exposure, but such is not necessary for the successful operation of the invention. However, the nucleated glass must be cooled to a temperature at least 25° C. below the strain point. The general effect of this second exposure is to intensify, or increase the color saturation of, the hue which was predetermined by the above-described first exposure to high energy or actinic radiation.

Thereafter, the glass is heated to a temperature within or somewhat above the transformation range of the glass, but below the softening point thereof. It is believed that submicroscopic granular particles of metallic silver are precipitated on the surfaces of the crystals. It is not known whether the silver is present as discrete colloidal particles or whether it forms a film on the crystal surfaces or enters into and becomes a fused mixture with the crystals at the surfaces thereof. Nevertheless, the quantity of silver precipitated and the geometry thereof, along with, perhaps, the refractive index of the halide crystals, are thought to determine the color produced. Here again, as was described above with respect to the first heat treatment, various modifications, including sequences of additional radiation exposures, of interrupted heatings and coolings, may be usefully desirable to optimize color intensity.

(The transformation range has been generally defined as that temperature at which a liquid melt is transformed into an amorphous mass, and has commonly been considered to lie in the vicinity of the annealing point of a glass.)

FIG. 1 diagrammatically illustrates the basic process steps of the present invention.

Glasses of the present invention differ from all known media for color photography in many ways, including the following. All of the colors of the spectrum can be photographically produced in a single medium so that superposition of multiple layers is not required. Also, the colors vary with the intensity of the incident radiation, rather than varying with the wave length of the exposing radiation as do most color photographic media. This means that the different shades of density in a black-gray-white photographic negative are translated into a range of colors when printed in these photographic glasses, while other photographic media require some form of color filters. Still further, no chemical solutions are involved in the photographic process.

The invention provides a means for converting a single glass composition into any desired color. Such capability can be of real commercial significance in a market such as the ophthalmic field for sunglasses and tinted lenses. Thus, the lens manufacturer would not have to incorporate the tinting ingredient in the original batch, thereby necessitating an inventory of several tints. Rather, the single clear glass could be exposed and heat treated upon receipt of a customer's order. It is quite apparent that the coloring treatment need not be done by the glass manufacturer but could be conducted by an entity in the marketing stream closer to the ultimate consumer. Such would greatly reduce the inventory of lenses required at that point of the marketing stream.

Another unique and valuable feature of this invention is the capability of developing three-dimensional images in photographically controlled colors and geometries within a glass article and not necessarily touching the exterior of the glass. This effect is obtained when the two required exposures (separated by a heat treatment) are made from different points. Since the "rainbow" colors develop only after both exposures, they develop only where the exposures of high energy or actinic radiation intersect the same volume element within the glass. The particular color or colors within this doubly exposed volume follow the rules for radiation flux at each volume element.

Such three-dimensional color images are entirely different from holograms. The latter are recordings of the interference patterns produced by coherent light waves, and require laser beams for exposure. It may well be that the glasses of this invention are also appropriate media for recording three-dimensional holograms using ultra-violet laser beams for exposure.

Glass articles demonstrating a single color, which color can be varied over the visible spectrum, can be produced wherein it is possible to vary the intensity of the color. Such glass articles are formed from compositions wherein the silver content will be partially thermally reduced in a heat treating step at temperatures between the transformation range and the softening point of the glass without a prior exposure to high energy or actinic radiations. This heat treatment can be undertaken as part of an annealing treatment of the initially-formed glass article. Thereafter, the preconditioned or presensitized glass will be exposed to high energy or actinic radiations followed by a heat treatment in the range of temperatures between the transformation range and the softening point of the glass.

Such glasses can be useful as tinted ophthalmic lenses where a family of glasses is supplied to a processor for tinting various shades of a given color utilizing a single exposure to some sort of actinic radiation followed by a heat treatment. Also, in color photography, several thin glass sheets, each being developable to a different hue, could be laminated together in the manner analogous to color photographic film.

FIG. 2 graphically depicts an acicular morphology which has been seen in the crystals present in the colored glasses. Thus, whereas the conventional alkali halide crystal is known to possess a cubic structure, the crystals developed in the instant glasses are believed to consist of a complex alkali fluoride silver halide combination, which crystals may differ from the conventional cubic structure of the alkali fluoride. Hence, the crystals can exhibit the shape of elongated pyramids with length-to-width ratios greater than two. This degree of anisotropic morphology can vary widely, depending upon the base composition of the glass and the heat treatment applied thereto. The blackened tip of the crystal represents silver concentrated in or on the tip of the crystal. In the colored glasses prepared according to the general method described above, the crystals will be randomly oriented. However, when the glass is treated such that the crystals are oriented linearly, a polarizing glass can be produced.

MECHANISM OF COLOR DEVELOPMENT

Although the mechanism underlying the development of colors within the inventive glasses has not been rigorously proven, the following explanation is based upon the evidence observed to date.

It is strongly believed that the broad spectrum of colors is caused by the presence of metallic silver. However, past experience has generally shown that colloidal silver in homogeneous glasses yields only yellow-to-amber colors, with an absorption peak at about 4200A. The fact that the present colors can be produced with extremely low concentrations of silver (as low as about 10 parts per million) and have many similarities with interference colors produced by thin metallic films has led to the conclusion that the colors are due to (a) discrete colloidal particles of silver; (b) silver contained within the halide crystals; and/or (c) thin granular films of metallic silver deposited at the surfaces of the halide crystals known to be developed within the glass.

Although the exact reaction path is not known with complete certainty, the following equations describe one which appears most reasonable.

The photosensitive precipitation of silver nuclei utilizes a photosensitizing agent, viz., cerous ions, and can be represented as follows:

$$Ag^+ + Ce^{+3} + h\nu \rightarrow Ag^0 + Ce^{+4} \quad (1)$$

The nucleation and growth of complex silver plus alkali metal (Na) halide crystals can be designated as:

$$(Ag^0)_n + x(Na^+ Ag^+) + xX^- \xrightarrow{heat} C, \quad (2)$$

wherein C is $(Ag^0)_n x(Na^+ + Ag^+)X$ and $X^-$ is a halide ion, i.e., $F^-$, $Cl^-$, $Br^-$, $I^-$, and combinations thereof.

The development of the colored species as a result of the second radiation exposure followed by heat treatment can be expressed as:

$$C + mAg + h\nu \xrightarrow{heat} C \cdot mAg^0, \quad (3)$$

wherein $C \cdot mAg^0$ is the crystal having granular particles of metallic silver therewith. Thus, $C \cdot mAg^0$ is the colored species and is postulated to have a film of silver or silver particles on the crystal surface or, perhaps, dispersed within the body.

The specific colors are undoubtedly related to the concentration of silver that is photo-reduced as the result of the second exposure to ultra-violet radiation. The colors and their intensities appear to be quantitatively related to the geometry of the silver film, and probably to the refractive index of the halide crystals in which the silver is held.

Compounds of tin and/or antimony are optionally added to vary photographic speed and color. These have been described in earlier photosensitive glass patents as thermo-reducing agents. They have the property of being able to reduce a fraction of the silver ions thermally (during cooling or reheating), independent of the photochemical reduction sensitized by cerium. This thermo-reducing reaction, initiating additional precipitation of silver, is described by the following equations.

$$n\,Ag^+ + \frac{n}{2} Sn^{+2} \longrightarrow n\,Ag^0 + \frac{n}{2} Sn^{+4}, \text{ and} \quad (4)$$

$$n\,Ag^+ + \frac{n}{2} Sb^{+3} \longrightarrow n\,Ag^0 + \frac{n}{2} Sb^{+5}. \quad (5)$$

These agents can be regarded as pre-sensitizers, increasing photographic speed. Tin compounds are the more effective of the two; and sometimes both are used together for better control, the system apparently acting as a buffered reduction system. Evidently part of the tin and antimony react with one another, as follows:

$$Sb^{+5} + Sn^{+2} \rightleftarrows Sb^{+3} + Sn^{+4}. \quad (6)$$

DESCRIPTION OF THE PREFERRED EMBODIMENTS

Figure 1:
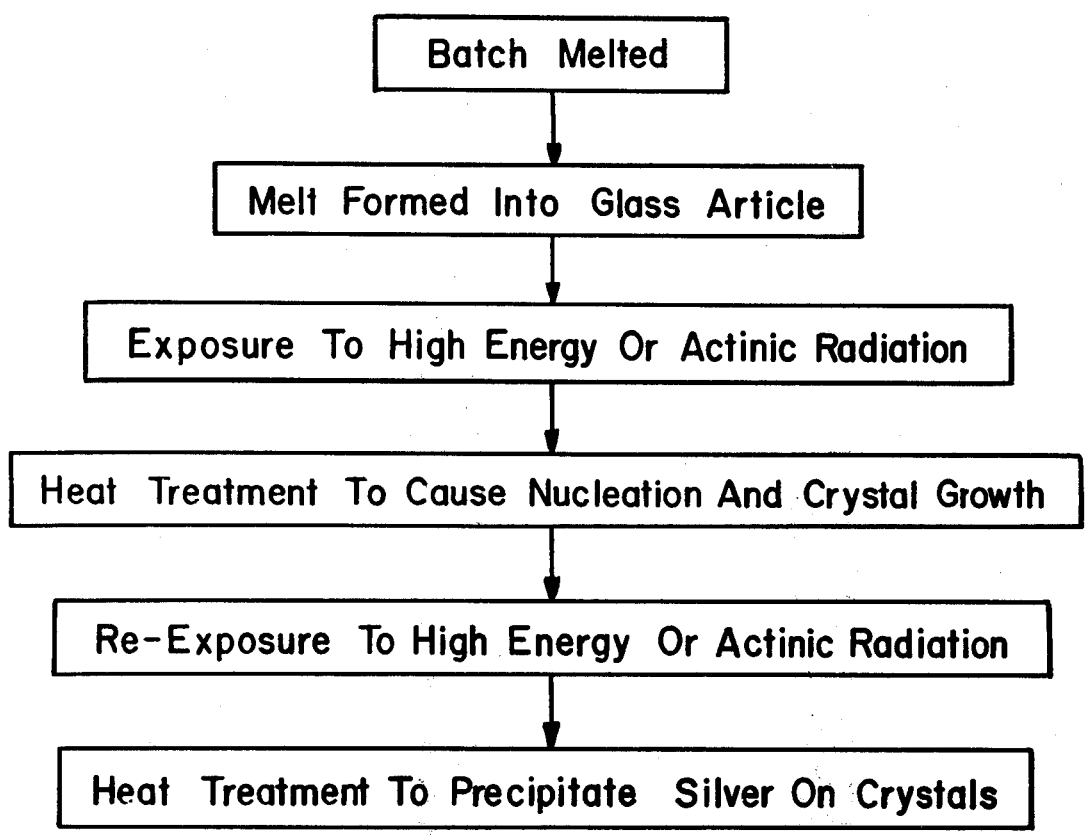

Table I records compositions, expressed in parts by weight on the oxide basis, of glasses which serve to illustrate the multicolored products of the instant invention. Since it is not known with which cation(s) the halides are combined, they are merely reported as fluoride, chloride, etc., in accordance with conventional glass analytical practice. Likewise, inasmuch as the silver is present in such small amounts, it is simply tabulated as Ag. The actual batch ingredients can comprise any material, either the oxide or other compound, which, when melted together, will be converted into the desired oxide in the proper proportions. The halides were commonly added as alkali metal halides. Occasionally, where $Sn^{+2}$ was employed as a thermoreducing agent, $SnCl_2$ was utilized as a batch material for that purpose. Inasmuch as the sum of the individual ingredients closely approximates 100, each may, for practical purposes, be deemed to be present in weight percent. Finally, although the following examples represent laboratory melts, it will be recognized that large-scale commercial melts utilizing pots or continuous tanks can be undertaken with glasses of the present invention.

Batches of approximately 1000 grams were compounded, the ingredients ball milled together to assist in obtaining a homogeneous melt, and then run into platinum crucibles. The filled crucibles were placed into an electrically-fired furnace operating at about 1450° C. and maintained therein for about four to six hours with stirring. The melts were then poured into steel molds to produce slabs about 6 inches × 6 inches × ½ inch and the slabs immediately transferred to an annealer operating at about 450° –480° C. The annealed slabs were colorless, transparent glass.

During the melting step up to as much as 50% by weight of the halide constituents and up to 30% by weight of the silver may be lost through volatilization.

TABLE I

|  | 1 | 2 | 3 | 4 | 5 | 6 | 7 | 8 |
|---|---|---|---|---|---|---|---|---|
| $SiO_2$ | 72.7 | 72.7 | 72.7 | 72.7 | 73.5 | 72.7 | 72.7 | 72.7 |
| $Na_2O$ | 18.3 | 18.3 | 18.3 | 18.3 | 10.0 | 18.5 | 18.5 | 18.5 |
| ZnO | 5.0 | 5.0 | 5.0 | 5.0 | 4.0 | 5.0 | 5.0 | 5.0 |
| $Al_2O_3$ | 6.8 | 6.8 | 6.8 | 6.8 | 7.5 | 6.8 | 6.8 | 6.8 |
| $Sb_2O_3$ | 0.1 | 0.1 | 0.1 | — | 0.1 | 0.1 | 0.1 | 0.5 |
| $CeO_2$ | 0.018 | 0.018 | 0.018 | 0.018 | 0.018 | 0.018 | 0.018 | 0.018 |
| Br | 0.1 | 0.1 | 0.4 | — | 0.1 | 0.1 | 0.1 | 0.1 |
| F | 2.8 | 2.8 | 2.5 | 2.5 | 2.6 | 2.5 | 2.5 | 2.5 |
| Ag | 0.003 | 0.006 | 0.005 | 0.0075 | 0.005 | 0.005 | 0.005 | 0.005 |
| $SnCl_2$ | 0.016 | 0.004 | 0.01 | 0.01 | 0.04 | — | — | — |
| $Li_2O$ | — | — | — | — | 1.0 | — | — | — |
| $K_2O$ | — | — | — | — | 1.0 | — | — | — |
| SnO | — | — | — | — | — | — | 0.1 | — |

|  | 9 | 10 | 11 | 12 | 13 | 14 | 15 | 16 |
|---|---|---|---|---|---|---|---|---|
| $SiO_2$ | 72.7 | 72.7 | 72.7 | 72.7 | 72.7 | 72.7 | 72.6 | 71.6 |
| $Na_2O$ | 18.3 | 18.3 | 18.3 | 18.3 | 18.3 | 18.3 | 18.3 | 16.8 |
| ZnO | 5.0 | 5.0 | 5.0 | 5.0 | 5.0 | 5.0 | 5.0 | 5.0 |
| $Al_2O_3$ | 6.8 | 6.8 | 6.8 | 6.8 | 6.8 | 6.8 | 6.8 | 6.9 |
| $CeO_2$ | 0.018 | 0.018 | 0.018 | 0.018 | 0.018 | 0.018 | 0.018 | 0.18 |
| Br | 0.2 | 0.2 | 0.2 | 0.3 | 1.1 | 1.1 | 1.1 | 0.4 |

TABLE I-continued

| | | | | | | | | |
|---|---|---|---|---|---|---|---|---|
| Sb$_2$O$_3$ | 0.2 | 0.2 | 0.2 | 0.1 | 0.1 | 0.1 | 0.1 | 0.1 |
| F | 2.5 | 2.5 | 2.5 | 2.5 | 2.5 | 1.5 | 1.0 | 2.4 |
| Ag | 0.00127 | 0.00127 | 0.00127 | 0.00127 | 0.0025 | 0.0025 | 0.0025 | 0.0025 |
| SnO | — | 0.04 | 0.08 | — | — | — | — | 0.04 |
| SnCl$_2$ | — | — | — | 0.01 | — | — | — | — |
| Cl | — | — | — | — | — | 1.0 | 1.5 | — |

| | 17 | 18 | 19 | 20 | 21 | 22 | 23 | 24 |
|---|---|---|---|---|---|---|---|---|
| SiO$_2$ | 71.6 | 71.6 | 71.6 | 71.6 | 71.6 | 72.0 | 71.0 | 71.0 |
| Na$_2$O | 16.8 | 16.8 | 16.8 | 16.8 | 16.8 | 16.2 | 16.0 | 16.0 |
| Al$_2$O$_3$ | 6.9 | 6.9 | 6.9 | 6.9 | 6.9 | 6.9 | 6.8 | 6.8 |
| ZnO | 5.0 | 5.0 | 5.0 | 5.0 | 5.0 | 5.0 | 5.0 | 5.0 |
| CeO$_2$ | — | 0.025 | 0.025 | 0.025 | 0.025 | 0.01 | 0.025 | 0.025 |
| Sb$_2$O$_3$ | 0.1 | 0.1 | 0.1 | 0.1 | 0.1 | — | 0.5 | — |
| Br | 0.4 | — | 0.4 | 0.1 | 0.2 | 1.1 | 0.825 | 0.825 |
| F | 2.4 | 2.4 | 2.4 | 2.4 | 2.4 | 2.5 | 2.1 | 2.1 |
| Cl | — | 0.4 | — | — | — | — | — | — |
| Ag | 0.0025 | 0.00125 | 0.0025 | 0.0025 | 0.0025 | 0.01 | 0.0033 | 0.0033 |
| SnCl$_2$ | 0.01 | 0.01 | — | — | — | — | — | — |
| SnO | — | — | 0.01 | 0.01 | 0.08 | — | — | 0.1 |
| I | — | — | 0.1 | 0.4 | — | — | — | — |

| | 25 | 26 | 27 | 28 | 29 | 30 | 31 | 32 |
|---|---|---|---|---|---|---|---|---|
| SiO$_2$ | 71.6 | 71.6 | 71.6 | 71.6 | 72.7 | 72.0 | 72.0 | 71.0 |
| Na$_2$O | 16.8 | 16.8 | 16.8 | 16.8 | 18.3 | 16.2 | 16.2 | 17.2 |
| ZnO | 5.0 | 5.0 | 5.0 | 5.0 | 5.0 | 5.0 | 4.85 | 4.85 | 5.0 |
| Al$_2$O$_3$ | 6.8 | 6.8 | 6.8 | 6.8 | 6.8 | 6.7 | 6.7 | 6.9 |
| CeO$_2$ | 0.025 | 0.025 | 0.025 | 0.025 | 0.025 | 0.025 | 0.025 | 0.025 |
| Br | 0.4 | 2.0 | 2.5 | 1.65 | 0.3 | 0.85 | 2.2 | 2.4 |
| F | 2.4 | 1.2 | 1.6 | 2.4 | 2.3 | 2.5 | 2.5 | 2.4 |
| Sb$_2$O$_3$ | 0.2 | 0.2 | 0.2 | 0.2 | 0.2 | 0.1 | 0.1 | 0.1 |
| Ag | 0.00375 | 0.0025 | 0.0025 | 0.0025 | 0.0005 | 0.005 | 0.005 | 0.0075 |
| SnO | — | — | — | — | 0.05 | — | — | — |
| I | — | 0.1 | 0.1 | — | — | 0.1 | 0.1 | 0.1 |

| | 33 | 34 | 35 | 36 | 37 | 38 | 39 |
|---|---|---|---|---|---|---|---|
| SiO$_2$ | 71.0 | 71.0 | 71.0 | 72.0 | 72.0 | 72.0 | 72.0 |
| Na$_2$O | 17.2 | 17.2 | 17.2 | 16.2 | 16.2 | 16.0 | 16.2 |
| ZnO | 5.0 | 5.0 | 5.0 | 5.0 | 5.0 | 12.0 | 5.0 |
| Al$_2$O$_3$ | 6.9 | 6.9 | 6.9 | 6.9 | 6.9 | — | 6.9 |
| CeO$_2$ | 0.025 | 0.025 | 0.025 | 0.025 | 0.05 | 0.025 | 0.05 |
| Br | 1.1 | 1.1 | 1.1 | 1.1 | 1.1 | 1.1 | 1.1 |
| F | 2.4 | 2.4 | 2.4 | 2.5 | 2.5 | 2.5 | 2.5 |
| Sb$_2$O$_3$ | 0.1 | 0.1 | 0.1 | 0.5 | 0.05 | 0.1 | 1.0 |
| Ag | 0.01 | 0.02 | 0.04 | 0.005 | 0.005 | 0.005 | 0.011 |
| I | 0.1 | 0.1 | 0.1 | — | — | — | — |
| SnO | — | — | — | 0.04 | 0.04 | 0.02 | 0.04 |

| | 40 | 41 | 42 | 43 | 44 | 45 | 46 | 47 | 48 |
|---|---|---|---|---|---|---|---|---|---|
| SiO$_2$ | 72.0 | 72.0 | 72.0 | 72.0 | 72.0 | 72.0 | 72.0 | 72.0 | 72.0 |
| Na$_2$O | 16.0 | 16.0 | 16.0 | 16.0 | 15.0 | 16.2 | 16.2 | 16.0 | 16.2 |
| Al$_2$O$_3$ | 4.0 | 6.0 | 8.0 | 12.0 | 6.0 | 6.9 | 6.9 | 7.0 | 6.7 |
| ZnO | 8.0 | 6.0 | 4.0 | — | 6.0 | 5.0 | 5.0 | — | 5.0 |
| F | 2.5 | 2.5 | 2.5 | 2.5 | 2.5 | 2.5 | 2.5 | 2.5 | 2.5 |
| Br | 1.1 | 1.1 | 1.1 | 1.1 | 1.1 | 1.1 | 1.1 | 1.1 | 1.1 |
| Ag | 0.005 | 0.005 | 0.005 | 0.005 | 0.005 | 0.05 | 0.01 | 0.01 | 0.0025 | 0.010 |
| Sb$_2$O$_3$ | 0.1 | 0.1 | 0.1 | 0.1 | 0.1 | 0.1 | 3.0 | 2.0 | 0.5 | — |
| SnO | 0.02 | 0.02 | 0.02 | 0.02 | 0.02 | — | — | 0.02 | 0.025 |
| CeO$_2$ | 0.025 | 0.025 | 0.025 | 0.025 | 0.025 | 0.025 | 0.08 | 0.08 | 0.025 | 0.025 |
| P$_2$O$_5$ | — | — | — | — | — | — | — | 5.0 | — |

| | 49 | 50 | 51 |
|---|---|---|---|
| SiO$_2$ | 72.0 | 72.0 | 66.0 |
| Na$_2$O | 16.0 | 16.0 | 18.0 |
| Al$_2$O$_3$ | 4.9 | 0.9 | 2.0 |
| B$_2$O$_3$ | 2.0 | 6.0 | — |
| F | 2.5 | 2.5 | 2.5 |
| Ag | 0.0025 | 0.0025 | 0.005 |
| Br | 1.1 | 1.1 | 1.1 |
| Sb$_2$O$_3$ | 0.025 | 0.025 | 0.4 |
| CeO$_2$ | 0.025 | 0.025 | 0.05 |
| SnO | 0.02 | 0.02 | 0.02 |
| ZnO | 5.0 | 5.0 | 14.0 |

As has been noted above, the desired colorations are secured through a sequence of exposures to high energy or actinic radiations and heat treatments at temperatures in excess of the transformation range of the individual glass. Such temperatures are required to create a sufficiently low vicosity in the glass to permit crystal growth. Temperatures higher than about the softening point of the glass will not normally be employed, except for very brief excursions, unless formers or some other type of physical supporting means are present, because of deformation or slumping of the glass body which will occur. Where a succession of heat treatments is applied, the glass article will frequently be cooled to a temperature at least 25° C. below the strain point thereof and then reheated. If desired, the article can be cooled to room temperature before being reheated. However, that is not necessary and in the procedures reported hereinafter the articles were merely cooled to temperatures below the strain point before being reheated, except for several special examples wherein color intensification was accomplished via added sequences of ultraviolet exposures and heat treatments. An electrically-fired furnace was utilized to carry out the recorded heat treatments.

A 1000-watt mercury vapor arc lamp having a peak intensity at a wave length of about 3200A provided the source of ultra-violet radiation in the following group of illustrative examples. The radiation exposures were undertaken at ambient temperatures as a matter of convenience, although there is no substantive reason forbidding such exposures at temperatures approaching the transformation range of the glass, if the necessary equipment is available. Other sources of ultra-violet radiation are, of course, operable. A high energy source is provided in an ultra-violet laser beam.

EXAMPLES 1 AND 2

Two strips of black masking tape opaque to ultra-violet radiations were placed on the glass slabs running in the same direction with a slight overlap therebetween. The strips were so placed as to divide the top surface area into approximate thirds. Thus, one-third of the surface was left uncovered and two-thirds were covered by the tapes. The slabs were then exposed at ambient temperature to the ultra-violet lamp at a distance of about 40 inches. After four minutes, the first tape was removed. After six minutes the second tape was removed. After eight minutes, the ultra-violet lamp was shut off. The slabs were then heated at furnace rate to about 540° C. and maintained thereat for 1.25 hours. The bodies exhibited a white opacity throughout.

Thereafter, the slabs with the total top surface exposed were again subjected at ambient temperature to ultra-violet radiation at a distance of 40 inches. After an exposure of about 16 minutes, the slabs were heated at furnace rate to about 400° C. and held thereat for 0.5 hour.

The top surface of the slabs exhibited three strips of color, the strip having the initial exposure of four minutes being yellow, the strip having the initial exposure of six minutes being yellow-green and the strip having the initial exposure of eight minutes being green.

EXAMPLES 3 and 4

Again using black masking tape opaque to ultra-violet radiations, the slabs were covered therewith and subjected at ambient temperature to ultra-violet radiations, at a distance of 40 inches, such that strips of the top surface thereof were exposed 0, 1, 2, 4, and 8 minutes, respectively. The slabs were then heated at furnace rate to 460° C., held thereat for 0.5 hour, and then raised at furnace rate to 540° C. and maintained thereat for 1 hour. Except for the unexposed strip, Examples 3 and 4 demonstrated a white opal appearance. The unexposed strip of each remained colorless and transparent.

Thereafter, strips of the masking tape were placed across the slabs at right angles to the direction of the first set of tapes and the slabs exposed at ambient temperature to ultra-violet radiations at a distance of 18 inches for 0, 16, 32, 64, and 128 minutes, respectively. Example 3 exhibited a variety of colors whereas Example 4 registered no change.

A further slab of Example 3 was then treated in like manner except that the original exposure to ultra-violet radiation was conducted at 18 inches rather than 40 inches. The table below is demonstrative of the appearance presented by the exposed surface of the slab at the conclusion of the sequence of treatments. As can be seen, a "rainbow" of colors can be produced by varying the times of the initial and second ultra-violet exposures.

| | | Second Exposure | | | | |
|---|---|---|---|---|---|---|
| | | 0' | 16' | 32' | 64' | 128' |
| Initial Exposure | 0' | ←———Clear and Colorless———→ | | | | |
| | 1' | White | ←———pale green———→ | | | |
| | 2' | White | ←———aquamarine———→ | | | |
| | 4' | Off White | Pink | Lavender | Purple | Dark Blue |
| | 8' | Pale Yellow | Pale Orange | Orange | Peach | Red-Pink |

A comparison of the compositions of Examples 3 and 4 clearly indicates the need for halogens other than fluorine to achieve color in the glass. Thus, the batch of Example 3 contained 0.4% Br as well as about 0.004% Cl resulting from the use of $SnCl_2$, whereas Example 4 contained only the chloride present in the $SnCl_2$. Thus, the fluoride provided a photosensitive opal glass but there was insufficient chloride in Example 4 to impart color thereto. Such is believed to indicate that the presence of fluoride alone will not produce the desired colored glasses. Rather, at least one of the other halides chloride, bromide, and iodide must also be included in an effective amount.

EXAMPLE 5

Portions of the slab were exposed at ambient temperature to ultra-violet radiations at a distance of 18 inches for 8 minutes and 16 minutes, respectively. The slab was then heated at furnace rate to 460° C., maintained thereat for about 0.5 hour, and then heated at furnace rate to 540° C. and held thereat for about 1 hour. The slab was a white opal body.

The slab was then subjected at ambient temperature to ultra-violet radiations at a distance of 18 inches such that portions thereof were exposed for 16 and 64 minutes, respectively. No color was produced. It is believed that $Li_2O$ interferes with the precipitation of NaF such that an amount of $Na_2O$ in excess of 10% will be operative in the invention.

EXAMPLES 6–8

Portions of the slabs were exposed at ambient temperature to ultra-violet radiations at a distance of 18 inches for four minutes and eight minutes, respectively. The slabs were thereafter heated at furnace rate to 460° C., maintained thereat for 0.5 hour, and then heated at furnace rate to 540° C. and held thereat for 1.25 hours. Upon cooling, Examples 6 and 7 were white opal bodies whereas Example 8 was only somewhat translucent. Example 8 was heated to 580° C. and, after 0.5 hour, took on a white, opaque appearance.

Subsequently, the three slabs were subjected at ambient temperature to ultra-violet radiations at a distance of 18 inches such that portions thereof were exposed for 16, 32, and 64 minutes, respectively. After being heat treated at 460° C. for about 20 minutes, colors ranging from pale green to beige were observed. The green portions were those of shorter exposure times.

It would appear from these examples that $Sb_2O_3$ can slow down the photosensitive reaction when present in greater amounts than necessary as a thermoreducing agent.

EXAMPLES 9-11

Portions of the slabs were subjected at ambient temperature to ultra-violet radiations at a distance of 18 inches for four minutes, six minutes, and eight minutes, respectively. The slabs were heated at furnace rate to 460° C., maintained thereat for 0.5 hours, heated at furnace rate to 540° C., and held thereat for 1 hour. Examples 9 and 10 were white opals, whereas Example 11 required heating to 580° C. to become fully opalized.

Thereafter, the three slabs were again subjected at ambient temperature to ultra-violet radiations at a distance of 18 inches such that portions thereof were exposed for 16, 64, and 128 minutes, respectively after which they were heated at furnace rate to 460° C. and held thereat for 0.5 hour. Examples 9 and 10 exhibited colors varying from pale green to beige, whereas Example 11 remained essentially unchanged.

It is postulated that the 0.08% SnO was too high a concentration for the 0.00127% Ag present, and reduced too great a portion of the silver to permit the production of a color-producing silver film on the crystals.

EXAMPLE 12

Example 12 is a further excellent example of the "rainbow" of colors that can be produced through various ultra-violet exposures and heat treatments. Utilizing several ultra-violet opaque tapes, as described above, various portions of the slab were subjected at ambient temperature to ultra-violet radiations at a distance of 18 inches for 0, 0.5, 0.75, 1, 1.5, 2, 3, 4, and 6 minutes, respectively. Subsequently, the slab was heated at furnace rate to 460° C., held thereat for 0.5 hour, heated at furnace rate to 540° C., and maintained thereat for 0.75 hour. The unexposed portion was colorless and transparent whereas the remainder was a white opaque body.

The slab was again exposed at ambient temperature to ultra-violet radiation at a distance of 18 inches utilizing the tapes placed at right angles to the direction of the first set of tapes for 0, 16, 32, 64, and 128 minutes, respectively. Finally, the slab was heated at furnace rate to 460° C. and held thereat for 0.5 hour.

The chart below depicts the colors observed in various portions of the slab following the sequence of exposures and heat treatments.

|  |  | Second Exposure | | | |
| --- | --- | --- | --- | --- | --- |
|  | 0' | 16' | 32' | 64' | 128' |
| Initial 0' | Colorless | ←———— Pale yellow translucent ————→ | | | |
| 0.5' | White | ←———————— Yellow ————————→ | | | |
| 0.75' | White | ←———————— Yellow ————————→ | | | |
| 1' | White | ←———————— Pale Green ——————→ | | | |
| 1.5' | White | Light Gray | ←————— Pale Green ——————→ | | |
| 2' | White | Gray | ←————— Aquamarine ——————→ | | |
| Exposure 2.5' | Pale Yellow | Lavender | Blue-Gray | Blue | Blue |
| 3' | Pale Yellow | Lavender | Violet | Dark Blue | Dark Blue |
| 4' | Pale Yellow | Peach | Pink | Magenta | Magenta |
| 5' | Pale Yellow | Yellow | Light Orange | Orange | Orange |

EXAMPLES 13-15

Portions of the three slabs were subjected at ambient temperature to ultra-violet radiation at a distance of 18 inches for four and eight minutes, respectively. Thereafter, the slabs were heated at furnace rate to 540° C., held thereat for 0.5 hour, cooled below the strain point, and heated at furnace rate to 580° C. After 0.5 hour, Example 13 became white and opaque, and after 1 hour, Example 14 also became white and opaque. Example 15 remained clear and so was heated to 640° C., but still did not opacify.

After exposures at ambient temperature to ultra-violet radiation at a distance of 18 inches for 16, 48, 80 and 144 minutes, respectively, and a heat treatment at 460° C. for 0.5 hour, Example 13 displayed a "rainbow" of colors and Example 14 was orange-beige over all parts of the exposed surface.

These examples demonstrate that a minimum of fluoride greater than about 1% by weight is apparently necessary for the operability of the instant invention.

EXAMPLE 16

Example 16 provides an excellent illustration of the "rainbow" of colors which can be produced in a transparent glass body. Utilizing the ultra-violet opaque tapes as described above, a glass slab was exposed at ambient temperature to ultra-violet radiation at a distance of 18 inches for 0, 1, 1.5, 2, 2.5, 3, 4, 6, and 8 minutes, respectively. The slab was then heated at furnace rate to 460° C., held thereat for 0.5 hour, cooled to about 350° C. (more than 25° C. below the strain point), and reheated at furnace rate to 540° C. for 35 minutes. The glass was transparent with a pale yellow hue.

The slab was then subjected at ambient temperature to ultra-violet radiation at a distance of nine inches for 0, 16, 32, 64, and 128 minutes, respectively. Thereafter, the slab was heated at furnace rate to 460° C. and maintained thereat for 0.5 hour.

The slab was transparent and exhibited the broad spectrum of colors recited below:

|  |  | Second Exposure | | | |
| --- | --- | --- | --- | --- | --- |
|  | 0' | 16' | 32' | 64' | 128' |
| Initial 0' | ←———————— Pale Yellow ————————→ | | | | |
| 1' | Pale Yellow | ←——— Pale Green ———→ | | | |
| 1¼' | Pale Yellow | Violet | Blue-Green | Green | Green |
| 2¼' | Pale Yellow | Lavender | Violet | Blue | Blue |
| Exposure 3' | Pale Yellow | Pink | Dark Lavender | Purple | Purple |
| 4' | Pale Yellow | Light Orange | Pink | Magenta | Dark Magenta |
| 6' | Pale Yellow | Yellow | Light Orange | Orange | Orange |

EXAMPLES 17-18

Portions of the two slabs were exposed at ambient temperature to ultra-violet radiations at a distance of 18 inches for four, six, and eight minutes, respectively. Thereafter, the slabs were heated at furnace rate to 460° C., held thereat for 0.5 hour, cooled to about 300° C. (more than 25° C. below the strain point), heated at furnace rate to 540° C. and maintained thereat for 0.5 hour. Example 18 exhibited a pale yellow opaque appearance, whereas Example 17 appeared unaffected.

Example 17 was then heated at furnace rate to 610° C. and held thereat for 0.5 hour. A slight haze was observed therein.

Portions of the two slabs were thereafter subjected at ambient temperature to ultra-violet radiation at a distance of 18 inches for 16, 32, and 64 minutes, respectively, and then heated at furnace rate to 460° C. and held thereat for 0.75 hour.

Example 17 was essentially unaffected whereas Example 18 displayed a full "rainbow" of colors.

This comparison of Example 17 with Example 18 is believed to clearly demonstrate the need for the presence of $CeO_2$ in the glass composition.

EXAMPLES 19-21

Various portions of the three slabs were subjected at ambient temperature to ultra-violet radiations at a distance of 18 inches for 0, 1, 2, 2½, 3, 4, and 6 minutes, respectively, heated at furnace rate to 460° C., held thereat for 0.5 hour, heated at furnace rate to 540° C., and held thereat for 1 hour. Examples 20 and 21 were red-brown opal glasses whereas Example 19 was a white opal.

Subsequently, the three slabs were subjected at ambient temperature to ultra-violet radiations at a distance of 18 inches such that various portions thereof were exposed for 0, 16, 32, 64, and 128 minutes, respectively. Thereafter, the slabs were heated at furnace rate to 460° C. and maintained thereat for 0.5 hour. Examples 20 and 21 retained their red-brown color, perhaps becoming somewhat darker-hued, while Example 19 exhibited the spectrum of colors depicted in the chart below. Examples 20 and 21 are believed to indicate the adverse effect that can result from an excess of SnO or iodide. Example 19 demonstrates that some excess of bromide over that required to stoichiometrically react with the silver present does not deleteriously affect the color-producing capability of the glass.

| Initial Exposure | Second Exposure | | | | |
|---|---|---|---|---|---|
| | 0' | 16' | 32' | 64' | 128' |
| 0' | ← | Colorless, Transparent | | | → |
| 1' | White | ← | Pale Green | | → |
| 2' | White | Gray | Aquamarine | | → |
| 2½' | White | Lavender | Violet | Blue | Bright Blue |
| 3' | White | Pink | Lavender | Purple | Purple |
| 4' | White | Light Orange | Orange | Red-Pink | Red-Pink |
| 6' | White | ← | Yellow | | → |

Portions of the slab were exposed at ambient temperature to ultra-violet radiation at a distance of 18 inches for 2, 4, 6, 8, and 10 minutes, respectively, heated at furnace rate to 460° C., held thereat for 0.5 hour, cooled below the strain point, reheated to 540° C., and maintained thereat for 1.25 hours. The slab displayed a light opal appearance.

Then, portions of the slab were subjected at ambient temperature to ultra-violet radiation at a distance of 9 inches for 15, 30, 60, and 120 minutes, respectively, and subsequently heated at furnace rate to 460° C. and held thereafter for 0.5 hour.

A very faint "rainbow" of colors was developed.

EXAMPLES 22-24

Portions of the three slabs were subjected at ambient temperature to ultra-violet radiations at a distance of 18 inches for 2, 4, 8, 16, and 32 minutes, respectively. Thereafter, the slabs were heated at furnace rate to 460° C., held thereat for 0.5 hour, cooled below the strain point, reheated at furnace rate to 540° C., maintained thereat for 1 hour, cooled below the strain point, reheated at furnace rate to 580° C., and held thereat for 0.5 hour. Each slab exhibited a pale yellow opaque appearance.

Subsequently, portions of the three slabs were exposed at ambient temperature to ultra-violet radiations at a distance of 18 inches for 16, 32, and 64 minutes, respectively, heated at furnace rate to 460° C., and held thereat for 0.5 hour. Example 22 displayed faint colors and Examples 23 and 24 exhibited a pale "rainbow" of colors.

It is believed that Examples 22-24 indicate the desirability for thermoreducing agents in the melt. Thus, Example 22, containing neither $Sb_2O_3$ or SnO, demonstrates very little color, whereas the presence of a small amount of either enhances the production of color.

EXAMPLE 25

This example yielded a full palette of very bright colors. In accordance with the practice repeatedly described above utilizing tape opaque to ultra-violet radiation, the slab was exposed at ambient temperature to ultraviolet radiation at a distance of 18" for 0, 1, 2, 3, 4, 6, and 8 minutes, respectively. The slab was then heated at furnace rate to 460° C., held thereat for 0.5 hour, heated at furnace rate to 540° C., and held thereat for 1.25 hours. The slab was observed to be a white opal glass body.

Thereafter, in like manner to that described above, portions of the slab were re-exposed at ambient temperature to ultra-violet radiations at a distance of 18 inches for 0, 16, 32, 64, and 128 minutes, respectively, and heated at furnace rate to 460° C. for 20 minutes. The chart below records the colors developed.

| Initial Exposure | Second Exposure | | | | |
|---|---|---|---|---|---|
| | 0' | 16' | 32' | 64' | 128' |
| 0' | White | ← | Pale Yellow | | → |
| 1' | Off White | Gray | Gray-Green | Green | Green |
| 2' | Off White | Pink | Magenta | Purple | Dark Blue |
| 3' | Off White | Orange | Red-Orange | Red-Pink | Red |
| 4' | Yellow | Light Orange | Orange | Orange | Dark Orange |
| 6' | Yellow | Yellow | Yellow | Yellow | Light Orange |
| 8' | Yellow | Yellow | Yellow | Yellow | Yellow |

It appears that where $Sb_2O_3$ is present alone as a thermoreducing agent, the resultant colors tend toward the yellow.

EXAMPLES 26-28

Portions of the three slabs were exposed at ambient temperature to ultra-violet radiation at a distance of 18 inches for four, six, eight, and ten minutes, respectively, heated at furnace rate to 460° C., held thereat for 0.5 hour, cooled below the strain point, reheated at furnace rate to 540° C., and maintained thereat for 1.5 hours. Example 28 appeared as a white opal body whereas Examples 26 and 27 were transparent. Examples 26 and 27 were then heated to 620° C., but remained transparent.

Portions of the three slabs were then exposed at ambient temperature to ultra-violet radiations at a distance of 9 inches for 15, 30, 60, and 120 minutes, respectively, and thereafter heated at furnace rate to 460° C. for 0.5 hour. Example 28 displayed a "rainbow" of colors, while Examples 26 and 27 were transparent with a yellow cast.

These compositions are believed to demonstrate the effect where insufficient fluoride is present. No opalization or color production is possible. Hence, at least about 1.0% F appears to be a practical minimum quantity.

EXAMPLE 29

Portions of the slab were exposed at ambient temperature to ultra-violet radiation at a distance of 18 inches for 4, 8, 16, and 32 minutes, respectively, heated at furnace rate to 460° C., maintained thereat for 0.5 hour, cooled to about 350° C. (more than 25° C. below the strain point), reheated at furnace rate to 540° C., and held thereat for 1.25 hours. A white opal body resulted.

Thereafter, portions of the slab were exposed at ambient temperature to ultra-violet radiations at a distance of 18 inches for 16, 32, and 64 minutes, respectively, heated at furnace rate to 460° C., and held thereat for 0.5 hour. Pale shades of pink were observed.

It is believed that the 0.0005% Ag reported in this example constitutes a practical minimum quantity thereof which has produced color in the inventive compositions.

EXAMPLES 30-31

Portions of the two slabs were subjected at ambient temperature to ultra-violet radiation at a distance of 18 inches for 2, 3, 4, and 6 minutes, respectively, heated at furnace rate to 460° C., maintained thereat for 0.5 hour, cooled below the strain point, reheated at furnace rate to 540° C., and held thereat for 40 minutes. Examples 30 and 31 were slightly hazy with a yellow cast.

Subsequently, portions of the two slabs were subjected at ambient temperature to ultra-violet radiation at a distance of nine inches for 8, 16, 32, and 64 minutes, respectively, heated at furnace rate to 460° C., and held thereat for 0.5 hour. An essentially transparent body resulted with colors varying from greens-to-oranges-to-yellows. The colors were quite pale in Example 30.

It is believed that these examples demonstrate the desirability for a minimum amount of thermoreducing agents. Thus, although a thermoreducing agent is not essential to the production of color, the presence thereof definitely enhances the development thereof. Therefore, 0.1% of $Sb_2O_3$ might be deemed a very desirable minimum addition.

EXAMPLES 32-35

Portions of the four slabs were exposed at ambient temperature to ultra-violet radiation at a distance of 18 inches for 3, 3.5, 4, and 6 minutes, respectively, heated at furnace rate to 460° C., maintained thereat for 0.5 hour, cooled to about 350° C. (more than 25° C. below the strain point), reheated at furnace rate to 540° C., and held thereat for 1.25 hours. Examples 32 and 33 resulted in dense white opal bodies; Examples 34 and 35 were not quite so densely opaque.

Thereafter, portions of the four slabs were exposed at ambient temperature to ultra-violet radiation at a distance of 18 inches for 16, 32, 64, and 128 minutes, respectively, heated at furnace rate to 460° C., and held thereat for 0.5 hour. Examples 32 and 33 exhibited a somewhat dull "rainbow" of colors, predominantly green-pink-orange. Examples 34 and 35 exhibited a liver-brown appearance.

Subsequently, the whole surface of each slab was subjected at ambient temperature to ultra-violet radiation at a distance of nine inches for two hours, heated at furnace rate to 460° C., and maintained thereat for 0.5 hour to intensify the colors. The colors of Example 32 became very dark and intense. Those of Example 33 were somewhat more intense. However, the color of Examples 34 and 35 remained a liver-brown.

EXAMPLES 36-37

These compositions produced an excellent "rainbow" of colors of high intensity, both in opal and transparent bodies.

To obtain a colored opal article, portions of the two slabs were subjected at ambient temperature to ultra-violet radiation at a distance of 18 inches for 1, 2, 3, 4, and 6 minutes, respectively, heated at furnace rate to 460° C., held thereat for 0.5 hour, cooled below the strain point, reheated at furnace rate to 540° C., and maintained thereat for 1.25 hours. Both slabs were a dense white opal.

Thereafter, portions of the two slabs were subjected at ambient temperature to ultra-violet radiation at a distance of nine inches for 16, 32, 64, and 143 minutes, respectively, heated at furnace rate to 460° C., and held thereat for 0.5 hour. A full palette of intense colors was displayed by each body.

To secure a colored transparent article, portions of another slab of each example were given the same ultra-violet exposure as that described above with respect to the opal bodies. The exposed slabs were then heated at furnace rate to 460° C., maintained thereat for 0.5 hour, cooled below the strain point, reheated at furnace rate to 540° C., and held thereat for 40 minutes. The slabs were essentially transparent with a slightly hazy appearance.

Thereafter, the slabs were subjected to a second ultra-violet exposure similar to that described above with respect to the opal bodies and the same heat treatment applied thereto. A good "rainbow" of colors was achieved and the glass body was essentially transparent. The colors did not appear to be quite as intense as those developed in the opal body, but such could be the effect caused by the white opal interior.

The length and/or temperature of the initial heat treatment determines whether a transparent or an opaque article will be formed. Thus, if only extremely small silver halide and/or alkali fluoride crystallites are developed in the first heat treatment, the article will appear transparent. Crystallite growth is a function of both time and temperature.

EXAMPLE 38

Portions of the slab were subjected at ambient temperature to ultra-violet radiation at a distance of 18 inches for 0.5, 1, 2, 4, 6, and 8 minutes, respectively, heated at furnace rate to 460° C., held thereat for 0.5 hour, cooled below the strain point, reheated at furnace rate to 540° C., and maintained thereat for 1.5 hours. A white opal glass was observed.

Subsequently, portions of the slab were exposed at ambient temperature to ultra-violet radiations at a distance of nine inches for 15, 30, 60, and 120 minutes, respectively, heated at furnace rate to 460° C., and held thereat for 0.5 hour.

A pale "rainbow" of colors was observed indicating that the presence of $Al_2O_3$ in the glass composition is not demanded for successful operation of the invention.

EXAMPLE 39

Example 39 produced one of the best spectrums of colors of any composition recorded in Table I, both in the opal and in the transparent body.

To achieve an opal product, various portions of the slab were subjected at ambient temperature to ultra-violet radiations at a distance of 18 inches for 3, 4, 6, 8, 10, 12, and 16 minutes, respectively, heated at furnace rate to 460° C., maintained thereat for 0.5 hour, cooled below the strain point, reheated at furnace rate to 540° C., and held thereat for 1.5 hours. A dense white opaque body was produced.

Thereafter, portions of the slab were exposed at ambient temperature to ultra-violet radiation at a distance of nine inches for 16, 32, 64, and 128 minutes, respectively, heated at furnace rate to 460° C., and maintained thereat for 0.5 hour. A full "rainbow" of colors of good intensity resulted.

To obtain a colored transparent article, portions of a different slab were exposed at ambient temperature to ultra-violet radiation in like manner to that described above with respect to the opal product and a similar initial heat treatment employed except that a dwell time at 540° C. of only 0.5 hour was utilized. A transparent body having a slight yellow cast was produced.

Thereafter, portions of the slab were exposed at ambient temperature to ultra-violet radiation at a distance of nine inches for 15, 30, 60, and 120 minutes, respectively, heated at furnace rate to 460° C., and held thereat for 0.5 hour. The slab was transparent and exhibited the entire range of colors.

To further intensify the colors, the entire slab was exposed to another 2-hour exposure of ultra-violet radiation at a distance of nine inches and again heated at furnace rate to 460° C. for 0.5 hour. The slab remained transparent and the intensity of the colors was, indeed, improved.

EXAMPLES 40–44

The ability to produce multi-color opal and transparent glass bodies in different alkali aluminosilicate compositions is evident from these examples.

To secure an opal article, portions of the five slabs were subjected at ambient temperature to ultra-violet radiation at a distance of 18 inches for 0.5, 1, 2, 4, 6, and 8 minutes, respectively, heated at furnace rate to 460° C., held thereat for 0.5 hour, cooled below the strain point, reheated at furnace rate to 540° C., and maintained thereat for 1.5 hours. Examples 40–42 became opaque bodies with a yellow cast. Example 43 was translucent. The latter was reheated at furnace rate to 580° C. and held thereat for 0.5 hour. A dense yellowish opal resulted.

Subsequently, portions of the five slabs were exposed at ambient temperature to ultra-violet radiation at a distance of 9 inches, heated at furnace rate to 460° C., and maintained thereat for 0.5 hour. A full palette of relatively intense colors was produced.

To intensify the colors, the whole slab was subjected at ambient temperature to ultra-violet radiation at a distance of nine inches for two hours, heated at furnace rate to 460° C., and held thereat for 0.5 hour. The chart below sets forth the colors exhibited by Example 42 after this intensifying treatment. In intensifying the colors, the subtle shadings initially seen in the different lengths of time to which portions of the slab were subjected to ultra-violet radiation in the second exposure also appeared to be removed. Thus, the long (2 hour) exposure appears to somewhat erase the time differential.

| Initial Exposure | Second Exposure | | | | |
| --- | --- | --- | --- | --- | --- |
| | 0' | 15' | 30' | 60' | 120' |
| 0' | Colorless | | ←Yellow Translucent→ | | |
| 0.5' | | | ←Pale Yellow→ | | |
| 1' | Pale Yellow | | | ←Pale Green→ | |
| 2' | Pale Yellow | | | ←Bright Blue→ | |
| 4' | Pale Yellow | | | ←Dark Maroon→ | |
| 6' | Pale Yellow | | | ←Orange→ | |
| 8' | Pale Yellow | | | ←Yellow→ | |

To produce a colored transparent body, portions from different slabs of Examples 40–44 were subjected at ambient temperature to ultra-violet radiation at a distance of 18 inches of 1, 2, 4, 6, and 8 minutes, respectively, heated at furnace rate to 460° C., maintained thereat for 0.5 hour, cooled below the strain point, reheated at furnace rate to 540° C., and held thereat for 1 hour. Each slab was transparent with a yellow cast.

Portions of the slabs were then exposed at ambient temperature to ultra-violet radiation and heat treated in the same manner as that described above in the second treatment of the opal slabs. The articles remained transparent and the chart below representing Example 41 is illustrative of the spectrum of colors resulting.

Example 43 indicates that the presence of ZnO is not required to make the glass compositions operable in the invention.

| Initial Exposure | Second Exposure | | | | |
| --- | --- | --- | --- | --- | --- |
| | 0' | 15' | 30' | 60' | 120' |
| 0' | Colorless | | | ←Pale Yellow→ | |
| 1' | Pale Yellow | | | ←Yellow→ | |
| 2' | Pale Yellow | | | ←Green→ | |
| 4' | Pale Yellow | Purple | | ←Dark Blue→ | |
| 6' | Pale Yellow | | | ←Magenta→ | |
| 8' | Pale Yellow | | | ←Orange→ | |

EXAMPLES 45–46

These examples are illustrative of the adverse affect which an excess of thermoreducing agent can have upon the colors induced.

Portions of the two slabs were exposed at ambient temperature to ultra-violet radiation at a distance of 18 inches for 2, 4, 6, 8, and 10 minutes, respectively, heated at furnace rate to 460° C., maintained thereat for 0.5 hour, cooled to about 300° C. (more than 25° C. below the strain point), reheated at furnace rate to 540° C., and held thereat for 1.25 hours. A white opaque body was formed having a yellow hue.

Subsequently, portions of the slabs were subjected at ambient temperature to ultra-violet radiations at a distance of nine inches for 15, 30, 60, and 120 minutes, respectively, heated at furnace rate to 460° C., and maintained thereat for 0.5 hour. A poor "rainbow" of dull, pale colors was produced.

EXAMPLE 47

A good palette of colors in an opal body was achieved in Composition 47 wherein $P_2O_5$ was substituted for ZnO.

Portions of the slab were subjected at ambient temperature to ultra-violet radiations at a distance of 18 inches for 0, 2, 4, 6, 8, and 10 minutes, respectively, heated at furnace rate to 460° C., maintained thereat for 0.5 hour, cooled below the strain point, reheated at furnace rate to 540° C., held thereat for 1 hour, cooled below the strain point, reheated at furnace rate to 580° C., maintained thereat for 35 minutes, and then heated to 620° C. for one hour.

Subsequently, portions of the slab were exposed at ambient temperature to ultra-violet radiations at a distance of nine inches for 15, 30, 60, and 120 minutes, respectively, heated at furnace rate to 460° C., and held thereat for 0.5 hour.

The resulting "rainbow" of colors ranged from deep purple, through blue, green, red, orange, and yellow.

As was observed above, the present invention permits the development of colored photographic images in a glass and provides the capability of developing three-dimensional images in photographically controlled colors and geometries within a glass article wherein the images do not touch the exterior surface of the glass. The following examples are illustrative of such phenomena.

EXAMPLE 48

A Kodak Tri-X panchromatic step wedge (a continuous tone black and white glass plate negative having ten different optical densities along its length) was employed as a photographic negative to produce a multi-color step wedge from the glass of Example 36. Portions of the wedge crossing each density step were exposed at ambient temperature to ultra-violet radiations at a distance of 18 inches for 8, 16, 32, and 40 hours, respectively, heated at furnace rate to 460° C., maintained thereat for 0.5 hour, cooled below the strain point, reheated at furnace rate to 540° C., and held thereat for 1 hour.

Thereafter, the entire wedge was exposed at ambient temperature to ultra-violet radiations at nine inches for 2 hours, heated at furnace rate to 460° C. and maintained thereat for 0.5 hour. The following chart depicts the resulting characteristics. Step 1 of the wedge had the lightest optical density whereas Step 10 was the darkest.

|  |  | EXPOSURE TIMES | | | | |
|---|---|---|---|---|---|---|
|  |  | 8 hours | 16 hours | 24 hours | 32 hours | 40 hours |
|  | 10 | Clear Yellow | Clear Yellow | Clear Yellow | Hazy Yellow | Hazy Yellow |
|  | 9 | Clear Yellow | Clear Yellow | Clear Yellow | Hazy Yellow | Hazy Yellow |
| Optical | 8 | Clear Yellow | Clear Yellow | Hazy Yellow | Pale Yellow Opal | Pale Yellow Opal |
|  | 7 | Hazy Yellow | Hazy Yellow | Celery Green Opal | Celery Green Opal | Celery Green Opal |
| Density | 6 | Pale Yellow Opal | Celery Green Opal | Pale Aqua Opal | Blue Opal | Blue Opal |
| Wedges | 5 | Celery Green Opal | Aqua Opal | Blue Opal | Purple-Blue Opal | Purple-Blue Opal |
|  | 4 | Aqua Opal | Blue Opal | Magenta Opal | Red-Pink Opal | Pale Red-Orange Opal |
|  | 3 | Blue Opal | Purple Opal | Red-Pink Opal | Red-Orange Opal | Orange Opal |
|  | 2 | Dark Blue Opal | Magenta Opal | Red-Orange Opal | Red-Orange Opal | Orange Opal |
|  | 1 | Magenta-Blue Opal | Magenta Opal | Red-Orange Opal | Red-Orange Opal | Orange Opal |

It is believed apparent from that example that the different densities of the wedge provide different colors in the final product. And Steps 9 and 10 yielded transparent or somewhat hazy bodies, whereas the less dense steps led to the development of opal portions.

In like manner, the different shades of density in a panchromatic photographic negative can be translated into a range of colors such as is illustrated in the examples below.

EXAMPLES 49–50

Portions of the two slabs were subjected at ambient temperature to ultra-violet radiation at a distance of 18 inches for 0, 2, 4, 6, 8, and 10 minutes, respectively. Subsequently, the slabs were heated at furnace rate to 460° C., held thereat for 0.5 hour, cooled below the strain point of the glass, heated at furnace rate to 540° C., maintained thereat for 1.25 hours, and Example 49 was then cooled to room temperature. Example 50 was cooled below the strain point of the glass, heated at furnace rate to 580° C., held thereat for one hour, and then cooled to room temperature. Both slabs were white and opaque.

Portions of both slabs were thereafter subjected at ambient temperature to ultra-violet radiation at a distance of 9 inches for 15, 30, 60, and 120 minutes, respectively. The slabs were then heated at furnace rate to 460° C., held thereat for 20 minutes, and finally cooled to ambient temperature. Both slabs demonstrated a "rainbow" of colors.

EXAMPLE 51

Portions of the slab were subjected at ambient temperature to ultra-violet radiation at a distance of 40 inches for 0, 2, 4, 6, 8, and 10 minutes, respectively. Subsequently, the slab was heated at furnace rate to 460° C., maintained thereat for 0.5 hour, cooled below the strain point of the glass, heated at furnace rate to 540° C., held thereat for 1 hour, and then cooled to ambient temperature. The slab exhibited an off-white, opaque appearance.

Subsequently, portions of the slab were subjected at ambient temperature to ultra-violet radiation at a distance of nine inches for 15, 30, 60, and 120 minutes, respectively. The slab was thereafter heated at furnace rate to 460° C., maintained thereat for 15 minutes, and then cooled to room temperature. The portions of the slab subjected to the shorter exposure periods exhibited a green color which graded into brown at the longer exposure.

EXAMPLE 52

A continuous tone, panchromatic photographic glass plate negative having a scene of a college campus was placed over a similar-sized plate of glass having the composition of Example 44, supra, and the composite unit exposed at ambient temperature to ultra-violet radiations at a distance of 18 inches for 16 hours. The negative was then removed and the plate of Example 44 heated at furnace rate to 100° C., 200° C., and 360° C., holding for about 5 minutes at each temperature. The temperature was thereafter raised at furnace rate to 460° C., held thereat for 0.5 hour, cooled to 300° C. (more than 25° C. below the strain point), and reheated at furnace rate to 540° C. for 1 hour.

The entire plate without the photographic negative was re-exposed at ambient temperature to ultra-violet radiations at a distance of 18 inches for one hour, heated at furnace rate to 460° C., and maintained thereat for 25 minutes.

The glass plate was transparent and picture developed within the glass was present in green and amber shades.

EXAMPLE 53

A continuous tone black and white photographic Eastman Type 33 glass plate negative, made by photographing a watercolor painting depicting a blue horse was placed over a similar-sized plate of glass having the composition of Example 36, supra, and the composite unit subjected at ambient temperature to ultra-violet radiations at a distance of 18 inches for eight hours. The negative was removed and the plate of Example 36 heated at furnace rate to 100°, 200°, and 360° C., holding for about 15 minutes at each temperature. The plate was then heated at furnace rate to 460° C., maintained thereat for 0.5 hour, cooled to 300° C. (more than 25° C. below the strain point), and reheated at furnace rate to 540° C. for 1.25 hours.

The entire plate without the photographic negative was re-exposed at ambient temperature to ultra-violet radiations at a distance of nine inches for 1 hour, heated at furnace rate to 460° C., and held thereat for 0.5 hour.

The glass plate was a white opal with the picture being present in shades of purple, blue, pale aquamarine, and orange.

EXAMPLE 54

Two 150-line, half-tone Kodalith Type 3, #8556 (thin base 0.0032 inches) tri-acetate base color separation negatives were secured. Each depicted a picture of apples. These were black and white negatives but one negative represented green whereas the other represented red.

The red negative was placed over a glass plate having the composition of Example 36, supra, and the composite unit exposed at ambient temperature to ultra-violet radiations at a distance of 18 inches for 16 minutes. The red negative was removed and the green negative placed thereover. The composite was subjected at ambient temperature to ultra-violet radiations at a distance of 18 inches for six minutes, and the negative then removed. The exposed article was heated in such a manner that 460° C. was reached in about 15 minutes and the article was maintained at that temperature for 0.5 hour. Subsequently, the article was cooled below the strain point, reheated at furnace rate to 540° C., and held thereat for 1.25 hours.

The entire article without either negative was exposed at ambient temperature to ultra-violet radiations at a distance of 9 inches for two hours, heated at furnace rate to 460° C., and maintained thereat for 0.5 hour.

A good opal image of the apples was achieved, but the colors were shades of blue and green, indicating underexposure through the "red" negative.

EXAMPLE 55

Strips of the above-described tape opaque to ultra-violet radiations were placed along the edges of one wide surface of a rectangular slab of glass having the composition of Example 44, supra, leaving a rectangular center portion uncovered. A similar placement of tape was made on one narrow surface of the slab adjacent thereto.

Portions of the uncovered center section of the wide surface was exposed at ambient temperature to ultra-violet radiations at a distance of 18 inches for 0, 0.5, 1, and 2 hours, respectively, heated at furnace rate to 460° C., maintained thereat for 0.5 hour, cooled below the strain point, reheated at furnace rate to 540° C., and held thereat for 0.5 hour.

Figure 3:
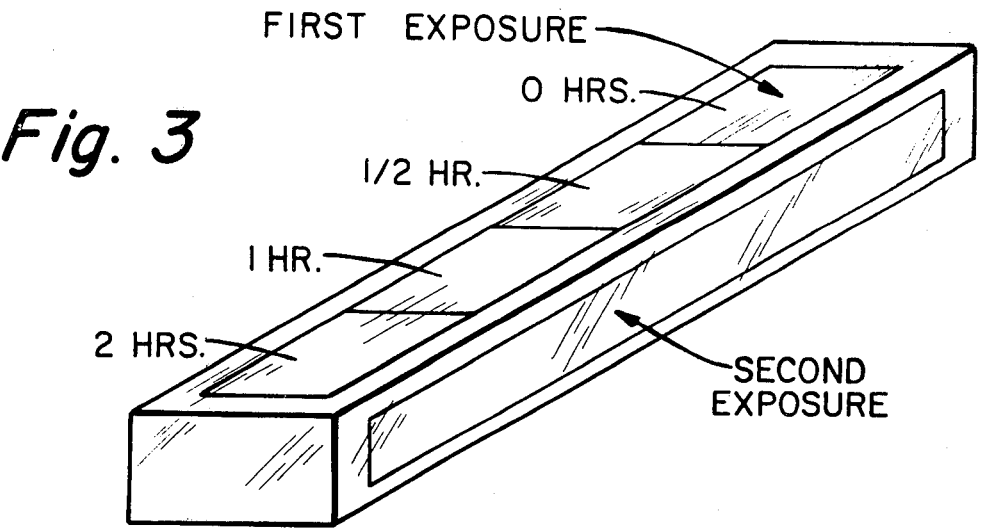
Figure 5:
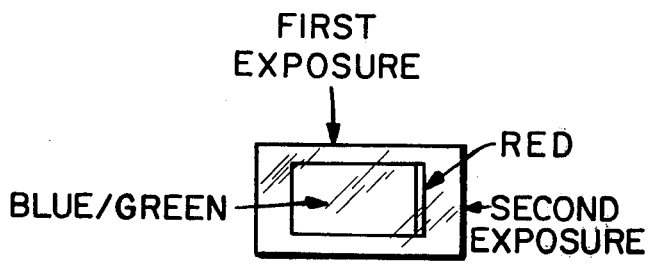
Figure 4:
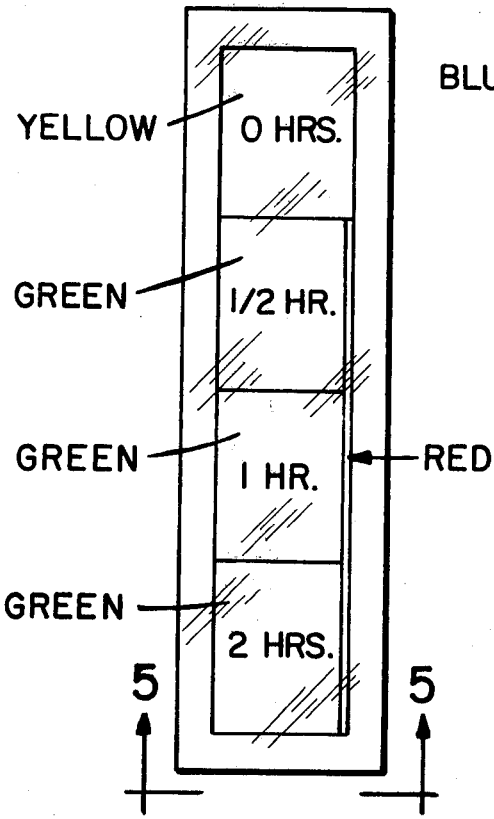

Thereafter, the adjacent surface of the slab (perpendicular to the first surface) having the taped edge portions was subjected at ambient temperature to ultra-violet radiations at a distance of 9 inches for 4 hours, heated at furnace rate to 460° C., and maintained thereat for 0.5 hour. FIGS. 3–5 of the drawing are illustrative of the method employed and the product attained thereby. Thus, FIG. 3 depicts the rectangular slab of glass with the edges of two adjacent faces covered with ultra-violet opaque tape. The area submitted to the first ultra-violet exposure is shown with the four portions thereof delineated. FIG. 4 depicts a side view of the final body taken in the direction of the first exposure. The article is transparent throughout. There appears to be a narrow band of red facing the side subjected to the second exposure of ultra-violet radiations. FIG. 5 represents an end view of the colored article. Again, the narrow band of red facing the side exposed to the second beam of ultra-violet radiation can be discerned.

As is apparent from an examination of the FIGURES, a three-dimensional image can be placed in the interior of a glass article at the intersection of the beams of ultra-violet radiation.

Another embodiment of the instant invention, founded upon the ability to produce a colored image in only one portion of a glass body, would lead to the production of different designs in different portions of the same glass body. For example, one design could be placed in the top surface portion of the glass and a different design placed on the reverse side of the glass by exposing the glass sequentially, front and rear. Hence, a background image could be imprinted which would differ from that of the foreground.

EXAMPLE 56

The depth to which color will be developed within a glass article is a function of the exposure flux of ultra-violet radiation and heat treatment. Very intense, bright colors were developed extending completely through a 0.5 inch thick plate of glass having the composition of Example 44 utilizing the following steps.

Th plate was exposed in various portions at ambient temperature to ultra-violet radiation at a distance of nine inches for 0, 1, 2, and 4 hours, respectively, heated at furnace rate of 460° C., maintained thereat for 0.5 hour, cooled below the strain point, reheated at furnace rate to 540° C., and held thereat for 1 hour.

Thereafter, the portions of the plate were subjected at ambient temperature to ultra-violet radiation at a distance of nine inches for 0, 2, 4 and 16 hours, respectively, heated at furnace rate to 460° C., and held thereat for 0.5 hour.

A transparent article resulted having the "rainbow" of colors set out in the chart below.

|  |  | Second Exposure | | | |
|---|---|---|---|---|---|
|  |  | 0 | 2 | 4 | 16 |
| Initial | 0 | Colorless | Yellow | Light Yellow | Light Yellow |
|  | 1 | Colorless | Green | Blue-Green | Blue |
| Exposure | 2 | Light Yellow | Blue | Orange | Red |
|  | 4 | Yellow | Red | Yellow | Yellow |

It has been learned that the development of colors within the glass can be expedited through the inclusion of greater amounts of silver in the glass composition. Commonly, as the quantity of silver is increased, high concentrations of reducing agents, particularly SnO, will also be utilized. Hence, such glasses will normally contain at least 0.01% Ag and in excess of about 0.05% SnO. The presence of larger silver contents substantially reduces the amount of radiation required, i.e., the time and intensity of the radiation, to cause photosensitive precipitation of silver nuclei during the initial exposure and the development of color as a result of the second exposure. The use of greater amounts of silver also enables the production of intense colors in glass articles of very thin cross section, e.g., microsheet, since the higher concentration of color centers imparts substantial color even in very thin-walled articles.

Nevertheless, such increased quantities of silver can have undesirable side effects. For example, spontaneous opalization can occur in the glass as the molten batch is cooled. Therefore, the melt should be quickly chilled to a temperature at least below the transformation range thereof to prevent the occurrence of that phenomenon. Where desired, the chilled glass article can be subsequently annealed. With glasses having base compositions similar to those reported in Table I, the melt will be quenched from a temperature of at least about 850° C. A further problem which may arise with greater silver contents is the tendency to overexpose the glass. Thus, the time and intensity of the incident radiation may cause reduction of the silver to such an extent that only a muddy amber-brown color develops throughout the exposed area of the glass.

EXAMPLE 57

Composition 48 of Table I was melted for 4 hours at 1450° C. and the resultant melt then run through steel rollers, thereby chilling the melt very rapidly to produce ribbon 2.5 inches wide with a thickness of 0.050 inch.

Portions of the ribbon were exposed at ambient temperature to ultra-violet radiations at a distance of 18 inches for 15 seconds and then heated at furnace rate to 460° C. The above-described amber-brown discoloration developed indicating the ultra-violet flux was so great that the silver was being excessively reduced.

Because of this, the distance between the sample and the source of ultra-violet radiation was extended to 40 inches. Portions of the ribbon were then subjected at ambient temperature to ultra-violet radiations for 1, 2, 3, 4, and 6 minutes, respectively, heated at furnace rate to 460° C., maintained thereat for 0.5 hour, cooled below the strain point, reheated at furnace rate to 540° C., and held thereat for 1.5 hours. The glass appeared clear with a pale yellow hue.

Thereafter, portions of the ribbon were exposed at ambient temperature to ultra-violet radiations at a distance of nine inches for 30, 60 and 120 minutes, respectively, heated at furnace rate to 460° C., and maintained thereat for 0.25 hour. The portions remained transparent and the chart below represents the "rainbow" of colors resulting. The colors were very bright and intense.

|  |  | Second Exposure | | |
|---|---|---|---|---|
|  |  | 30' | 60' | 120' |
|  | 1' | Green | Green | Green |
| Initial | 2' | Purple | Blue-Green | Blue-Green |
| Exposure | 3' | Red | Dark Lavendar | Dark Blue |
|  | 4' | Orange | Red | Burgundy |
|  | 6' | Amber | Orange | Dark Orange |

Subsequently, the entire ribbon sample was subjected to another 1-hour exposure of ultra-violet radiation at a distance of nine inches and again heated at furnace rate to 460° C. for 0.25 hour. The ribbon remained transparent but the colors became much darker and intense with some change of hue, as is illustrated in the following chart.

|  | After Intensifying | | |
|---|---|---|---|
|  | 30' | 60' | 120' |
| 1' | Pale Green | Pale Green | Pale Green |
| 2' | Green | Green | Green |
| 3' | Dark Blue | Dark Blue | Dark Blue |
| 4' | Dark Magenta | Purple | Deep Blue |
| 6' | Dark Orange | Dark Red-Pink | Dark Magenta |

This invention also permits the decoration of various substrates with colored glazes in a variety of colors. Thus, for example, the glass can be comminuted to a powdered frit, the frit applied to a glass, glass-ceramic, ceramic, or metal surface, and then fired to cause the frit to sinter and thereby obtain a tightly-adherent coating. The coated article can then be subjected to the radiation and heat treatments of the invention to develop colors and patterns therein, where desired. A simple illustration of this practice is set out below.

EXAMPLE 58

Pieces of the ribbon of composition 48, described immediately above in Example 54, were ground to pass a No. 40 United States Standard Sieve (420 microns). The powder was placed onto six microscope glass slides of soda lime composition marketed by Corning Glass Works, Corning, New York as Corning Code 0211. The slides were then transferred to a furnace operating at 850° C. and held therein for 10 minutes. A transparent film resulted having a slight brownish tint.

The coated slides were then subjected at ambient temperature to ultra-violet radiation at a distance of 40 inches for 1, 2, 3, 4, 6, and 8 minutes, respectively, heated at furnace rate to 460° C., maintained thereat for 0.5 hour, cooled below the strain point of the glass, reheated at furnace rate to 540° C., and held thereat for 1.5 hours.

Subsequently, portions of each side are exposed at ambient temperature to ultra-violet radiations at a distance of nine inches for 15, 30, 60, and 120 minutes, respectively, heated at furnace rate of 460° C., and maintained thereat for 20 minutes.

The slide that had been initially exposed for one minute exhibited a green color, the tint of which varied with longer subsequent exposures. The slide that had been initially exposed for 2 minutes demonstrated a pale brown color which became somewhat darker with the longer subsequent exposures. The slide that had been exposed for three minutes manifested an orange color, the hue of which became darker as the subsequent exposure became longer. The other three slides exhibited yellow colors of varying shades.

It will be appreciated that a photographic image could be developed in such a glaze in a similar manner to that described above with respect to glass slabs.

EXAMPLE 59

Glass ribbon about 2.5 inches wide with a thickness of about 0.050 inches was produced from composition 48 and two sections were cut therefrom.

Portions of the first section were exposed at ambient temperature to X-radiations generated at 55 kilovolts and 40 milliamperes for 0.5, 1, and 5 minutes, respectively. Portions of the second section were subjected at ambient temperature to X-radiations generated at 25 kilovolts and 60 milliamperes for 0.5, 1, 2, and 5 minutes, respectively.

Thereafter, the ribbon sections were heated at furnace rate to 460° C., held thereat for 0.5 hour, cooled below the strain point of the glass (below about 300° C.), heated at furnace rate to 540° C., and maintained thereat for 1.25 hours.

Subsequently, the exposed and heat treated sections were subjected at ambient temperature to ultra-violet radiation at a distance of 9 inches for 1 hour. The sections were then heated at furnace rate to 460° C. and held thereat for 15 minutes.

In the first ribbon section, the portion exposed to X-rays for 0.5 minute exhibited a deep red-amber color; that exposed to 1 minute of X-radiation an orange color; and that exposed for 5 minutes of X-radiation an amber tint.

In the second ribbon section, the portion exposed to X-rays for 0.5 minute displayed a green color; that exposed to 1 minute and that exposed to 2 minutes of X-radiation an amber color; and that exposed to 5 minutes of X-rays a yellow hue.

Figure 6:
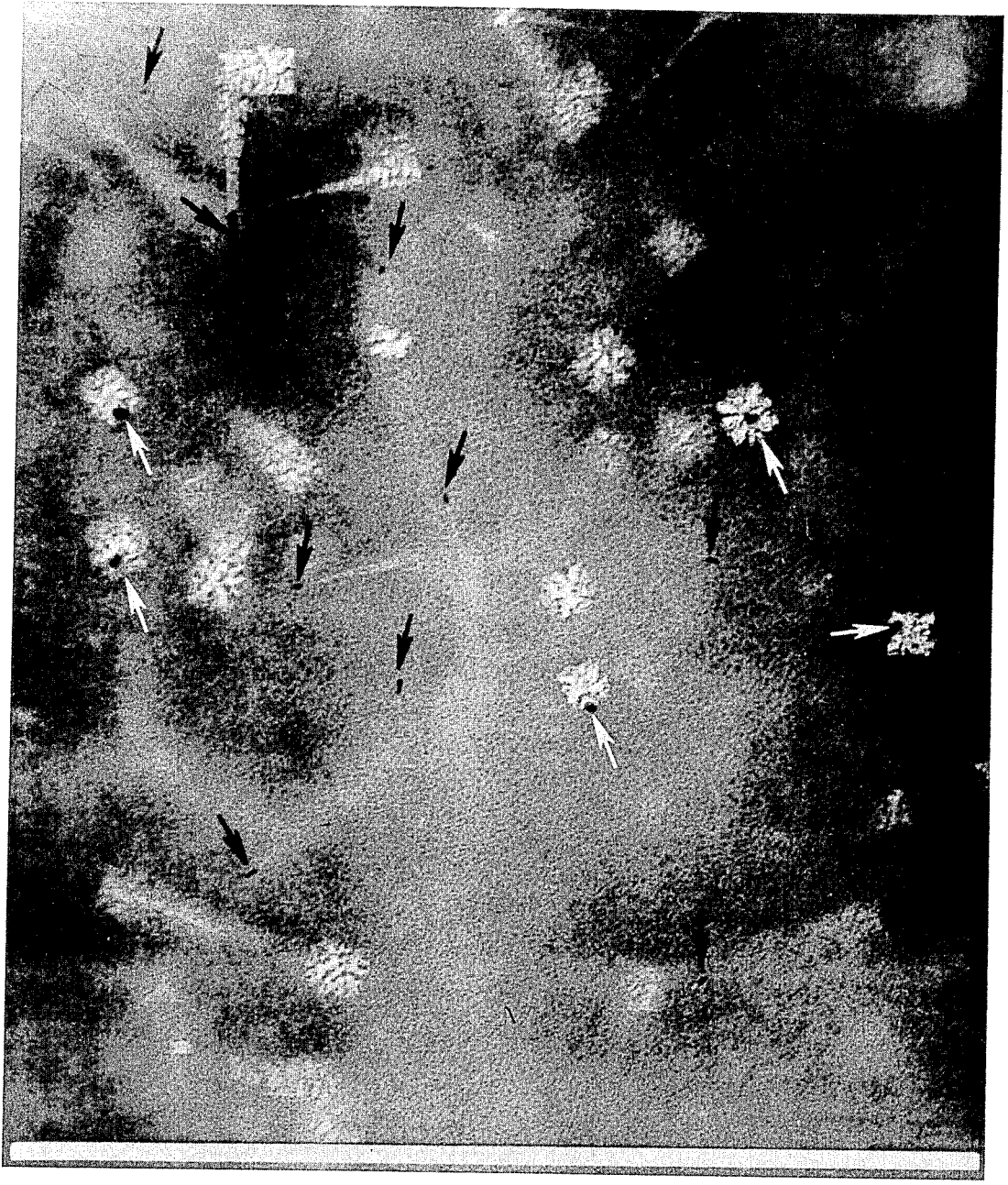
Figure 7:

As has been pointed out above, the crystals of alkali fluoride-silver halide may have a decided anisotropic morphology. FIGS. 6 and 7 are transmission electron micrographs from an argon ion-thinned section of a transparent piece of a step wedge described above in Example 48 having a blue color. The white bar at the base of the micrograph represents a distance of one micron.

Figure 2:
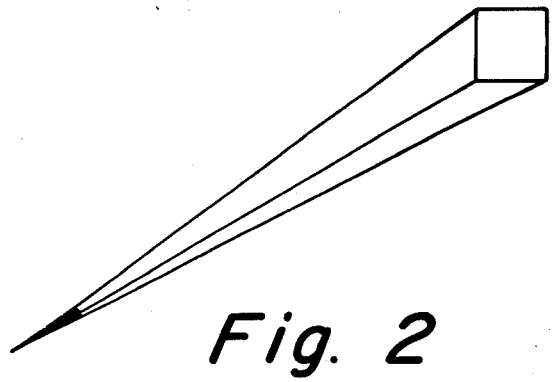

The micrographs depict very thin random slices through the material. However, the slice is sufficiently thick such that some of the crystals would lie entirely within the thin section. In transmission, the viewer sees two-dimensional projections of three-dimensional crystals, so the morphology thereof may not always be clear. Nevertheless, it is believed that FIG. 2 is a reasonable characterization thereof. The density variations observed in the matrix glass suggest that phase separation is present therein on a smaller scale than the crystals.

The silver-containing compounds have a higher density than any other structures present in the sample. Therefore, neglecting diffraction effects, those compounds will have the darkest appearance in the micrographs. At first glance, it appears that two types of high density regions are present. These are indicated on the micrographs with black and white arrows. However, further study appeared to indicate that the high density regions may not be in fact different, but only represent a view from different orientations of the crystals. Hence, the structures observed in the micrographs result from taking random sections through heterogeneously dispersed crystals having the general acicular morphology exhibited in FIG. 2 with silver concentrated in or on the tip of the crystal. The dark splotches on the crystals are thought to be silver deposited on the surface thereof.

Electron microscopic examination of the crystal morphology after the first heat treatment only, i.e., before the re-exposure to actinic radiation followed by the second heat treatment, has not shown the occurrence of crystals with darkened tip portions or dark splotches on the surfaces.

It is believed that the colors developed within the glasses of the instant invention are due to the presence of metallic silver. However, the mechanism through which the metallic silver operates to produce color is not fully understood. For example, the silver can be present as discrete colloidal particles of silver which may or may not be anisotropic in shape, but which are smaller than about 200A in the minimum dimension. Or, the silver may be contained within the alkali fluoride microcrystals; here again, the silver-containing portion of the microcrystal will be smaller than about 200A in the minimum dimension. Finally, the silver may be present as a coating on the surface of the alkali fluoride microcrystals, the part of the microcrystal being coated with silver being smaller than about 200A in the minimum dimension. Hence, the mechanism of color development may be the result of any of these phenomena or, perhaps, some combination of two or more of them.

S. D. Stookey and R. J. Araujo in "Selective Polarization of Light Due to Absorption by Small Elongated Silver Particles in Glass," *Applied Optics*, 7, No. 5, pp. 777–779, May, 1968, describe a process for making polarizing glasses by stretching glass containing colloidal silver particles. This stretching of the glass resulted in elongation of the silver particles and orienting them linearly.

By utilizing the same principle, viz., aligning the silver particles and/or the alkali fluoride-silver halide crystals in linear orientation, a colored polarizing glass can be produced. The manner for achieving alignment of such halide particles can involve any known method such as performing the initial crystal growing heat treatment in a magnetic or electric field or in a heat gradient environment, or by stretching the glass during or after the initial heat treatment. The glass with the aligned crystals will then be exposed to high energy or actinic radiation and heat treated to precipitate silver on the crystals.

The presence of discrete colloidal particles of silver or microcrystals of alkali fluoride containing silver chloride and/or silver bromide and/or silver iodide with submicroscopic particles of metallic silver precipitated therein or thereon is demanded to yield a glass displaying the desired characteristics. Such crystals can be secured by either incorporating the necessary constituents in the glass batch, as reported in the above illustrative examples, or by introducing silver ions into an article of glass containing the required halide anions and alkali metal, e.g., sodium, but being free from silver. This can be accomplished by contacting a surface of such a glass with a silver-containing material, commonly a batch of a molten silver salt or a paste consisting of a silver-containing material in finely-divided form, and heating the glass and contacting material in accordance with conventional silver staining or chemical strengthening procedures, whereby an exchange of silver for alkali metal ions occurs in at least a surface portion of the glass. The silver ions can thereafter react with the halide anions and precipitate as metallic silver particles.

It is believed that several conclusions can be drawn from a review of the above examples. First, the simplest base glass composition, disregarding such practical considerations as chemical durability, melting and forming characteristics, etc., would be a sodium silicate glass. Thus, KF does not precipitate in the manner of NaF and Li+ seems to interfere with the NaF precipitation. Therefore, whereas minor amounts of $K_2O$ and $Li_2O$ can be tolerated their presence is not required. Second, at least about 1% F, at least about 0.0005% Ag, more than about 10% $Na_2O$, and at least an amount of Cl, Br, and/or I sufficient to react stoichiometrically with the Ag must be present in a sodium silicate-based glass composition. And, where ultraviolet radiations comprise the actinic radiation, at least about 0.01% $CeO_2$ is required. Third, while not required, the presence of at least 0.01% of SnO and/or $Sb_2O_3$ is highly desirable. However, their presence in amounts in excess of about 1% hazards spontaneous opacification and inhibition of color development. In general, the $Sb_2O_3$ contents will range between about 0.1–1% and that of SnO will vary between about 0.01–0.1%. Fourth, at least two separate sequences of ultra-violet exposure and subsequent heat treatment are demanded to produce a plurality of colors. Fifth, a transparent or opal multi-colored glass can be obtained by closely regulating the temperature and/or time of the first heat treatment applied to the glass body such that the size of the colloidal silver particles and/or halide crystallites developed can be controlled. Thus, the growth of extremely small silver particles and/or halide crystallites, i.e., having diameters less than the wave length of visible light, will result in transparent articles, whereas larger crystals cause the development of opacity. Sixth, additions such as the alkaline earth oxides which may precipitate a fluoride crystal in competition with NaF crystals can only be tolerated in small amounts.

In general, more than about 4% F and/or 0.3% Ag will cause spontaneous opacification of the glass as it is cooled from the original molten batch. More than about 0.2% $CeO_2$ causes sufficient absorption of ultraviolet radiations to effectively destroy the photosensitivity of the glass. Since where the glass to be exposed to high velocity electrons, or x-radiations to promote development of color, $CeO_2$ is not a required constituent, the general composition of the glass contains about 0.0 to 0.2% $CeO_2$. Contents of $Na_2O$ much in excess of about 20% frequently lead to reduced chemical durability of the glass, while contents of less than about 10% inhibit the necessary type of crystallization. Finally, the sum of Cl, Br, and/or I will preferably not exceed about 3% since greater amounts hazard spontaneous opacification or coloration as the original molten batch is cooled to a glass or reheated.

In summary, where a sodium silicate composition constitutes the base glass, the composition will consist essentially, by weight on the oxide basis, of about 10–20% $Na_2O$, 0.0005–0.3% Ag, 1–4% F, an amount of at least one halide selected from the group Cl, Br, and I sufficient to react stoichiometrically with the Ag, but not more than a total of about 3%, and the remainder $SiO_2$. And, where the actinic radiation is provided in the ultra-violet portion of the spectrum, about 0.01 $\propto$ 0.2% $CeO_2$ is required. Useful optional additions in substantial amounts to improve chemical durability, melting and forming behavior, and other physical characteristics include up to 18% ZnO and up to 10% $Al_2O_3$. Minor amounts of other compatible metal oxides well-known to the glassmaker can be tolerated. For example, up to about 6% $B_2O_3$ and/or $P_2O_5$ may be included. In general, the total of these compatible ingredients will not exceed about 10%. Inasmuch as the preferred silicate glasses contains ZnO and/or $Al_2O_3$ plus, optionally, other ingredients, the $SiO_2$ content will commonly range between about 60–75%.

As has been explained above, the plurality of colors integrally included within the glasses of the invention is the result of the presence of discrete colloidal particles of colloidal silver or of microcrystals of NaF which also contain, or have deposited thereon, AgCl, AgBr, and/or AgI. To achieve the desired coloration, the composite crystals will be present in a concentration of at least 0.005% by volume. Where transparency in the colored glass is desired, the size of the crystal must be maintained very small, preferably not over about 0.1 micron in diameter, and the total concentration of the crystals will preferably not exceed about 0.1% by volume. These latter parameters will be more easily achieved where the content of silver is maintained below about 0.1%, the content of fluoride does not exceed about 3%, and the total of Cl, Br, and/or I is held below about 2.0%.

The method for producing these multi-colored or polychromatically-colored glass articles can be summarized in seven general steps. First, a glass batch is compounded containing the constituents of alkali fluoride and at least one silver halide selected from the group consisting of silver chloride, silver bromide, and silver iodide. Second, the batch is melted and formed into a glass article. Third, at least a portion of the article is exposed to high energy or actinic radiation. Fourth, at least said exposed portion of the glass article is heated to a temperature between about the transformation range and the softening point of the glass for a sufficient period of time to cause nucleation and growth of alkali halide microcrystals containing at least one silver halide selected from the group consisting of silver chloride, silver bromide, and silver iodide. Fifth, at least said previously-exposed portion of said article is re-exposed to high energy or actinic radiation. Sixth, at least the re-exposed portion of the glass article is heated to a temperature between the transformation range and the softening point of the glass for a sufficient length of time to cause metallic silver to be deposited as discrete collodial particles less than about 200A in the smallest dimension, and/or deposited within said microcrystals, the silver-containing part of the microcrystals being less than about 200A in the smallest dimension, and/or deposited on the surface of said microcrystals, the portion of the microcrystal coated with silver being less than about 200A in the smallest dimension. Seventh, the article is cooled to room temperature.

As has been demonstrated above, exposing a glass having a composition within the operable ranges of the invention to high energy or actinic radiations will generally determine the final color that will appear after subsequent reheating, re-exposure, and final heating. The second exposure mainly changes the intensity of the color.

However, it has been found that a similar behavior occurs when a glass contains a small concentration of thermally reduced silver, but where the glass has not been given a prior exposure to actinic radiations. This reduced silver determines the final color that will appear after subsequent heating, exposure to actinic radiation, and final heating. The color sequence appears to be the same in both cases, viz., green for the shortest pre-exposure to actinic radiation and for the least thermal reduction, followed by blue, violet, red, orange and yellow. Moreover, in both cases, further exposure to actinic radiations prior to the first heat treatment will change the final color in the same sequence as recited above.

To illustrate, if the glass has been initially sensitized to produce a color intermediate in the scale, e.g., violet, any additional pre-exposure or pre-reduction will yield colors further along in the sequence after processing. There will be no regression to green, for example. Extreme exposure or pre-reduction results in a uniform yellow coloration.

However, where the initial sensitization of the glass is accomplished through the thermal reduction of silver, the composition of the glass requires higher proportions of silver and thermal reducing agents (commonly SnO and $Sb_2O_3$).

Table II records compositions, expressed in parts by weight on the oxide basis, of glasses illustrating the single-color or monochrome embodiment of the invention. Batches were compounded, melted, and poured into slabs in like manner to the glasses reported in Table I. As a matter of laboratory convenience only, the slabs were simply annealed to room temperature as colorless, transparent bodies and then heat treated. In commercial production the newly-formed glass articles could be subjected to an initial heat treatment immediately after forming.

TABLE II

|  | A | B | C | D | E | F | G | H |
| --- | --- | --- | --- | --- | --- | --- | --- | --- |
| $SiO_2$ | 72.0 | 72.0 | 72.0 | 72.0 | 72.0 | 72.0 | 72.0 | 72.0 |
| $Na_2O$ | 16.2 | 16.2 | 16.2 | 16.2 | 16.2 | 16.2 | 16.2 | 16.2 |
| ZnO | 5.0 | 5.0 | 5.0 | 5.0 | 5.0 | 5.0 | 5.0 | 5.0 |
| $Al_2O_3$ | 6.9 | 6.9 | 6.9 | 6.9 | 6.9 | 6.9 | 6.9 | 6.9 |
| F | 2.5 | 2.5 | 2.5 | 2.5 | 2.5 | 2.5 | 2.5 | 2.5 |
| $CeO_2$ | 0.025 | 0.075 | 0.025 | 0.025 | 0.025 | 0.025 | 0.025 | 0.025 |
| Br | 1.1 | 1.1 | 1.1 | 1.1 | 1.1 | 1.1 | 1.1 | 1.1 |
| $Sb_2O_3$ | 0.1 | 1.0 | 0.1 | 0.1 | 0.2 | 0.2 | 0.2 | 0.2 |
| Ag | 0.005 | 0.005 | 0.004 | 0.005 | 0.005 | 0.005 | 0.007 | 0.009 |
| SnO | 0.4 | 0.4 | 0.4 | 0.08 | 0.05 | 0.07 | 0.06 | 0.06 |

EXAMPLES A–B

The slabs were heated at furnace rate to 540° C., held thereat for 1.5 hours, and cooled to ambient temperature. Example A exhibited a yellowish, opaque appearance whereas Example B demonstrated a pale yellow transparent appearance.

Portions of each slab were thereafter subjected at ambient temperature to ultra-violet radiation at a distance of 9 inches for 16, 32, 64, and 128 minutes, respectively. The slabs were then heated at furnace rate to 460° C., maintained thereat for 25 minutes, and finally cooled to room temperature.

The slab of Example A was a green opaque body whereas Example B was green and transparent. It is believed that the high $Sb_2O_3$ content, viz., 1%, retards the thermoreduction of the silver during the heat treating step. Hence, the development of a transparent body in Example B in contrast to the opaque article of Example A.

EXAMPLES C–D

The slabs were heated at furnace rate to 540° C., maintained thereat for 1.25 hours, and cooled to room temperature. Both bodies exhibited an off-white, opaque appearance. Portions of each slab were subsequently subjected at ambient temperature to ultra-violet radiation at a distance of 9 inches for 16, 32, 64, and 128 minutes, respectively. Thereafter, the slabs were heated at furnace rate to 460° C., held thereat for 0.5 hour, and then cooled to room temperature.

Example C was a gray-green opaque body whereas Example D exhibited a dark maroon, opaque appearance.

EXAMPLES E–F

The slabs were heated at furnace rate to 460° C., held thereat for 0.5 hour, cooled below the strain point of the glass, heated at furnace rate to 540° C., maintained thereat for one hour, and cooled to room temperature. Each slab was transparent with a yellowish tint.

Portions of each slab were thereafter subjected at ambient temperature to ultra-violet radiation at a distance of nine inches for 15, 30, 60, and 120 minutes, respectively. Subsequently, the slabs were heated at furnace rate to 460° C., held thereat for 20 minutes, and then cooled to ambient temperature.

Each slab exhibited a green transparent appearance, the color being more intense with increased ultra-violet exposure prior to the second heat treatment.

The method for producing these monochromatically colored glass articles can be defined in six general steps. First, a glass batch is formulated which contains the necessary components for NaF, at least one silver halide selected from the group AgCl, AgBr, and AgI, and a thermoreducing agent. Second, the batch is melted and the melt formed into a glass article. Third, at least a portion of the glass article is subjected to a temperature between about the transformation range and the softening point of the glass for a sufficient length of time to reduce part of the silver ion content to metallic silver particles and to cause nucleation and growth of halide microcrystals. Fourth, at least the heat treated portion of the glass article is exposed to high energy or actinic radiations. Fifth, at least the exposed portion of the glass article is heated to a temperature between about the transformation range and the softening point of the glass for a sufficient length of time to cause metallic silver to be deposited as discrete colloidal particles less than about 200A in the smallest dimension, and/or deposited within said microcrystals, the silver-containing part of the microcrystals being less than about 200A in the smallest dimension, and/or deposited on the surface of said microcrystals, the portion of the microcrystal coated with silver being less than about 200A in the smallest dimension, the concentration of the microcrystals being at least 0.005% by volume. In like manner to the potentially polychromatic glass articles formed through successive exposure to high energy or actinic radiations, transparent articles are achieved where the concentration of the microcrystals does not exceed about 0.1% by volume and the size thereof does not exceed about 0.1 micron in diameter.

In general, the monochrome color developed depends upon the concentration of silver and a thermoreducing agent in the glass which, in the examples of Table II, was SnO. It also appears that the color progressively changes from green through blue, violet, red, and yellow with increased SnO at a given silver concentration. To insure the production of monochrome bodies, a silver content of at least about 0.02% and a SnO content of at least about 0.002% are required in the base glass composition. The fluoride content will preferably exceed about 2%.

Although not illustrated specifically, X-radiations and an electron beam are equally applicable in the actinic radiation exposure step as ultra-violet radiations. Where ultra-violet radiations within the range of about 2800A-3500A constitute the actinic radiation, $CeO_2$ will be required in the glass composition, generally in amounts varying between about 0.01-0.2%.

We claim:
1. A method for making a glass article wherein at least a portion thereof is integrally colored by silver which comprises the steps:
   a. melting a batch for a glass containing the constituents of alkali fluoride, the constituents of at least one silver halide selected from the group consisting of silver chloride, silver bromide, and silver iodide, and about 0.0 to 0.2% $CeO_2$;
   b. forming said melt into a glass article;
   c. exposing at least a portion of said article to high energy or actinic radiation selected from the group consisting of high velocity electrons, X-radiations, and ultra-violet radiations;
   d. heating at least said exposed portion of the article to a temperature between about the transformation range and the softening point of the glass for a period of time sufficient to cause nucleation and growth of microcrystals of sodium fluoride containing at least one silver halide selected from the group consisting of silver chloride, silver bromide, and silver iodide to occur within said exposed portion;
   e. re-exposing at least said previously-exposed portion of said article to said high energy or actinic radiation;
   f. heating at least said re-exposed portion of said article to a temperature between the transformation range and the softening point of the glass for a period of time sufficient to cause metallic silver to be deposited as discrete colloidal particles less than about 200A in the smallest dimension, and/or deposited within said microcrystals, the sivler-containing part of the microcrystals being less than about 200A in the smallest dimension, and/or deposited on the surface of said microcrystals, the portion of the microcrystal coated with silver being less than about 200A in the smallest dimension, said microcrystals having a concentration of at least 0.005% by volume; and then
   g. cooling said article to room temperature.

2. A method according to claim 1 wherein said glass article exhibits transparency and the concentration of said microcrystals does not exceed about 0.1% by volume and the size of said microcrystals does not exceed about 0.1 micron in diameter.

3. A method according to claim 2 wherein the content of silver is held below about 0.1% by weight, the fluoride content does not exceed about 3% by weight, and the total chloride and/or bromide and/or iodide is maintained below about 2% by weight.

4. A method according to claim 1 wherein said batch contains about "0.01 to 0.2% " $CeO_2$.

5. A method according to claim 1 wherein the glass composition is a sodium silicate based glass.

6. A method according to claim 5 wherein said base glass consists essentially, by weight on the oxide basis, of about 10–20% $Na_2O$, 0.0005–0.3% Ag, 1–4% F, 0.01–0.2% $CeO_2$, an amount of at least one halide selected from the group consisting of Cl, Br, and I sufficient to react stoichiometry with the Ag, but not more than a total of about 3%, and the remainder $SiO_2$.

7. A method according to claim 6 wherein said base glass also contains up to 18% ZnO and/or up to 10% $Al_2O_3$.

8. A method according to claim 7 wherein said $SiO_2$ content ranges between about 60–75%.

9. A method according to claim 6 wherein said base glass also contains up to about 1% $Sb_2O_3$ and/or up to about 0.1% SnO, the total $Sb_2O_3$ + SnO not exceeding about 1%.

10. A method according to claim 4 wherein said actinic radiation consists of ultra-violet radiation having a wavelength within the range of about 2800A – 3500A.

11. A method according to claim 1 wherein said actinic radiation consists of X-radiation.

12. A method for making a glass article wherein at least a portion thereof is integrally colored by silver which comprises the steps:
   a. contacting the surface of a glass article containing $Na_2O$, F, at least one halide selected from the group consisting of Cl, Br, and I, "and about 0 to 0.2% $CeO_2$." with a silver-containing material;
   b. heating said glass article and said silver-containing material in contact therewith for a sufficient length of time to effect an exchange of silver ions for sodium ions in at least the surface of the glass;
   c. exposing at least a portion of said article to high energy or actinic radiation selected from the group consisting of high velocity electrons, X-radiations, and ultra-violet radiations;

d. heating at least said exposed portion of the article to a temperature between about the transformation range and the softening point of the glass for a period of time sufficient to cause nucleation and growth of microcrystals of sodium fluoride containing at least one silver halide selected from the group consisting of silver chloride, silver bromide, and silver iodide to occur within said exposed portion;

e. re-exposing at least said previously-exposed portion of said article to high energy or actinic radiation selected from the group consisting of high velocity electrons, X-radiations, and ultra-violet radiations;

f. heating at least said re-exposed portion of said article to a temperature between the transformation range and the softening point of the glass for a period of time sufficient to cause metallic silver to be deposited as discrete colloidal particles less than 200A in the smallest dimension, and/or deposited within said microcrystals, the silver-containing part of the microcrystal being less than about 200A in the smallest dimension, and/or deposited on the surface of said microcrystals, the portion of the microcrystal coated with silver being less than about 200A in the smallest dimension, said microcrystals having a concentration of at least 0.005% by volume;

g. cooling said article to room temperature.

13. A method according to claim 12 wherein said glass article contains about "0.01 to 0.2% " $CeO_2$.

14. A method according to claim 13 wherein said actinic radiation consists of ultra-violet radiation having a wavelength within the range of about 2800A–3500A.

15. A method for coating a glass, glass-ceramic, ceramic, or metal substrate with a colored glaze comprising the steps of:

a. melting a batch for a glass containing the constituents of sodium fluoride and the constituents of at least one silver halide selected from the group consisting of silver chloride, silver bromide, and silver iodide; and about 0–0.2% $CeO_2$;

b. forming said melt into a glass and comminuting said glass into a frit;

c. applying said frit to the substrate to be coated;

d. firing the coated substrate at a temperature sufficient to sinter the frit into a tightly-adherent glaze;

e. exposing at least a portion of said glazed substrate to high energy or actinic radiation, selected from the group consisting of high velocity electrons, X-radiations, and ultra-violet radiations;

f. heating at least said exposed portion of the glazed substrate to a temperature between about the transformation range and the softening point of the glaze for a period of time sufficient to cause nucleation and growth of microcrystals of sodium fluoride containing at least one silver halide selected from the group consisting of silver chloride, silver bromide, and silver iodide to occur within said exposed portion;

g. re-exposing at least said previously-exposed portion of said glazed substrate to high energy or actinic radiation, selected from the group consisting of high velocity electrons, X-radiations, and ultraviolet radiations;

h. heating at least said re-exposed portion of the glazed substrate to a temperature between the transformation range and the softening point of the glaze for a period of time sufficient to cause metallic silver to be deposited as discrete colloidal particles less than 200A in the smallest dimension, and/or deposited within said microcrystals, the silver-containing part of the microcrystal being less than about 200A in the smallest dimension, and/or deposited on the surface of said microcrystals, the portion of the microcrystal coated with silver being less than about 200A in the smallest dimension, said microcrystals having a concentration of at least 0.005% by volume; and then i. cooling said glazed substrate to room temperature.

16. A method according to claim 15 wherein said batch contains about "0.01 to 0.2%" $CeO_2$.

17. A method according to claim 16 wherein said actinic radiation consists of ultra-violet radiation having a wavelength within the range of about 2800A–3500A.

18. A method for making a glass article wherein at least a portion thereof is integrally colored by silver in a single color which comprises the steps:

a. melting a batch for a glass containing the constituents of sodium fluoride, the constituents of at least one silver halide selected from the group consisting of silver chloride, silver bromide, and silver iodide, about 0 to 0.2% $CeO_2$" and a thermoreducing agent;

b. forming said melt into a glass article;

c. subjecting at least a portion of said glass article to an elevated temperature between about the transformation range and the softening point of the glass for a period of time sufficient to reduce part of the silver to metallic silver and initiate nucleation and growth of microcrystals of sodium fluoride containing at least one silver halide selected from the group consisting of silver chloride, silver bromide, and silver iodide;

d. exposing at least said portion of the glass article subjected to said elevated temperature to high energy or actinic radiation selected from the group consisting of high velocity electrons, X-radiations, and ultra-violet radiations;

e. heating at least said exposed portion to a temperature between the transformation range and the softening point of the glass for a period of time sufficient to cause metallic silver to be deposited as discrete collodial particles less than 200A in the smallest dimension, and/or deposited within said microcrystals, the silver-containing part of the microcrystal being less than about 200A in the smallest dimension, and/or deposited on the surface of said microcrystals, the portion of the microcrystal coated with silver being less than about 200A in the smallest dimension, said microcrystals having a concentration of at least 0.005% by volume; and then f. cooling said article to room temperature.

19. A method according to claim 18 wherein said batch contains about "0.01 to 0.2%" $CeO_2$.

20. A method according to claim 19 wherein said actinic radiation consists of ultra-violet radiation having a wave-length within the range of about 2800A–3500A.

21. A method for making a glass article wherein at least a portion thereof is integrally colored and polarizing which comprises the steps:

a. melting a batch for a glass containing the constituents of sodium fluoride, the constituents of at least one silver halide selected from the group consisting of silver chloride, silver bromide, and silver iodide and about 0 to 0.2% $CeO_2$";
b. forming said melt into a glass article;
c. exposing at least a portion of said article to high energy or actinic radiation, selected from the group consisting of high velocity electrons, X-radiations, and ultraviolet radiations;
d. heating at least said exposed portion of the article to a temperature between about the transformation range and the softening point of the glass in such a manner and for a period of time sufficient to cause nucleation and growth of microcrystals of sodium fluoride containing at least silver halide selected from the group consisting of silver chloride, silver bromide, and silver iodide to occur in linear orientation within said exposed portion;
e. re-exposing at least said previously-exposed portion of said article to high energy or actinic radiation, selected from the group consisting of high velocity electrons, X-radiations, and ultraviolet radiations;
f. heating at least said re-exposed portion of said article to a temperature between the transformation range and the softening point of the glass for a period of time sufficient to cause metallic silver to be deposited as discrete colloidal particles less than 200A in the smallest dimension, and/or deposited within said microcrystals, the silver-containing part of the microcrystal being less than about 200A in the smallest dimension, and/or deposited on the surface of said microcrystals, the portion of the microcrystal coated with silver being less than about 200A in the smallest dimension, said microcrystals having a concentration of at least 0.005% by volume; and then
g. cooling said article to room temperature.

22. A method according to claim 21 wherein said crystals are aligned in linear orientation by growing in a magnetic or electric field.

23. A method according to claim 21 wherein said crystals are aligned in linear orientation by growing in a heat gradient environment.

24. A method according to claim 21 wherein said crystals are aligned in linear orientation by stretching the glass article during or after the heat treatment for growing the crystals.

* * * * *

UNITED STATES PATENT AND TRADEMARK OFFICE
CERTIFICATE OF CORRECTION

PATENT NO. : 4,057,408

DATED : November 8, 1977

INVENTOR(S) : Joseph E. Pierson and Stanley D. Stookey

It is certified that error appears in the above-identified patent and that said Letters Patent are hereby corrected as shown below:

Front page, line 7 of the Abstract, "alkali halide silver" should be -- alkali halide·silver --.

Column 1, line 9, "This" should be -- The --.

Column 1, line 10, "lyopacifiable" should be -- ly-opacifiable --.

Column 4, line 38, "fluoride silver" should be -- fluoride·silver --.

Column 5, line 15, "xX-heat" should be -- $xX^- \xrightarrow{heat}$ --.

Column 5, line 22, "heat" should be -- $\xrightarrow{heat}$ --.

Columns 5 and 6, Table I, Example 16, constituent $CeO_2$, "0.18" should be -- 0.018 --.

Columns 7 and 8, Table I-continued, Example 37, constituent $Sb_2O_3$, "0.05" should be -- 0.5 --.

Column 21, line 60, after "half-tone" insert -- Kodak --.

UNITED STATES PATENT AND TRADEMARK OFFICE
CERTIFICATE OF CORRECTION

PATENT NO. : 4,057,408
DATED : November 8, 1977
INVENTOR(S) : Joseph E. Pierson and Stanley D. Stookey It is certified that error appears in the above-identified patent and that said Letters Patent are hereby corrected as shown below:

Column 25, line 12, "side" should be -- slide --.

Column 25, line 64, "fluoride-silver" should be -- fluoride·silver --.

Column 26, line 64, "fluoride-silver" should be -- fluoride·silver --.

Column 28, line 23, "0.01∝0.2%" should be 0.01-0.2% --.

Columns 29 and 30, Table II, Example C, constituent SnO, "0.4" should be -- 0.04 --.

Column 31, line 32, "concentration" should be -- concentrations --.

Column 31, line 38, "0.02%" should be -- 0.002% --.

Column 31, line 39, "0.002%" should be -- 0.02% --.

Column 32, line 5, Claim 18, Step e., remove ";" after "tion" and insert -- , selected from the group consisting of high velocity electrons, x-radiations, and ultra-violet radiations; --.

Column 32, Claim 4, remove the quotation marks from 0.01 to 0.2%.

UNITED STATES PATENT AND TRADEMARK OFFICE
CERTIFICATE OF CORRECTION

PATENT NO. : 4,057,408

DATED : November 8, 1977

INVENTOR(S) : Joseph E. Pierson and Stanley D. Stookey

It is certified that error appears in the above-identified patent and that said Letters Patent are hereby corrected as shown below:

Column 32, Claim 12, Step a., remove the quotation marks from -- and about 0 to 0.2% $CeO_2$ --; remove the period after "$CeO_2$".

Column 33, Claim 13, remove the quotation marks from -- 0.01 to 0.2% --.

Column 34, Claim 16, remove the quotation marks from -- 0.01 to 0.2% --.

Column 34, Claim 18, Step a., remove the quotation mark after -- $CeO_2$ --; insert a comma after $CeO_2$.

Column 34, Claim 19, remove the quotation marks from -- 0.01 to 0.2% --.

Column 34, Claim 20, "wave-length" should be -- wavelength --.

Column 35, Claim 21, Step a., line 2, remove the quotation mark after -- $CeO_2$ --.

Signed and Sealed this

Twenty-seventh Day of June 1978

[SEAL]

Attest:

RUTH C. MASON
*Attesting Officer*

DONALD W. BANNER
*Commissioner of Patents and Trademarks*